(12) United States Patent  
Mahon et al.

(10) Patent No.: US 12,437,878 B2  
(45) Date of Patent: Oct. 7, 2025

(54) DATA PROCESSING SYSTEM FOR GENERATING PREDICTIONS OF COGNITIVE OUTCOME IN PATIENTS

(71) Applicant: Carnegie Mellon University, Pittsburgh, PA (US)

(72) Inventors: Bradford Mahon, Pittsburgh, PA (US); Keith Parkins, Rochester, NY (US); Max Sims, Rochester, NY (US); Benjamin Chernoff, Pittsburgh, PA (US); Hugo Angulo-Orquera, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1033 days.

(21) Appl. No.: 17/272,603

(22) PCT Filed: Dec. 2, 2019

(86) PCT No.: PCT/US2019/064015  
§ 371 (c)(1),  
(2) Date: Mar. 1, 2021

(87) PCT Pub. No.: WO2020/113221  
PCT Pub. Date: Jun. 4, 2020

(65) Prior Publication Data  
US 2021/0375480 A1    Dec. 2, 2021

Related U.S. Application Data

(60) Provisional application No. 62/917,258, filed on Dec. 1, 2018.

(51) Int. Cl.  
*A61B 5/372*    (2021.01)  
*A61B 5/00*    (2006.01)  
(Continued)

(52) U.S. Cl.  
CPC .......... *G16H 50/70* (2018.01); *A61B 5/0042* (2013.01); *A61B 5/0077* (2013.01); *A61B 5/055* (2013.01);  
(Continued)

(58) Field of Classification Search  
CPC ........ G16H 50/20; G16H 50/50; G16H 50/70; G16H 50/30; G16H 10/60; A61B 5/369;  
(Continued)

(56) References Cited

U.S. PATENT DOCUMENTS 7,647,087 B2    1/2010  Miga et al.  
9,586,053 B2 *  3/2017  Moffitt ................ A61N 1/3605  
(Continued)

OTHER PUBLICATIONS

Extended European Search Report in European Appln No. 19890320.5, dated Jan. 5, 2022, 5 pages.  
(Continued)

*Primary Examiner* — Deborah L Malamud  
(74) *Attorney, Agent, or Firm* — Fish & Richardson P.C.

(57) ABSTRACT

A system for outputting a visual representation of a brain of a patient is configured to receive sensor data representing a behavior of a region of the brain of the patient. The system retrieves mapping data that maps a prediction value to the region. The prediction value is indicative of an effect on a behavior of the patient responsive to a treatment of the region, the mapping data being indexed to a patient identifier. The system receives, responsive to an application of a stimulation to the region, sensor data representing behavior of the region. The system executes a model that updates, based on the sensor data, the prediction value for the region. The system updates, responsive to executing the model, the mapping data by including the updated prediction value in  
(Continued)

the mapping data. The system outputs a visual representation of the updated mapping data comprising the updated prediction value.

24 Claims, 12 Drawing Sheets

(51) Int. Cl.

| | |
|---|---|
| *A61B 5/055* | (2006.01) |
| *A61B 5/24* | (2021.01) |
| *A61B 34/10* | (2016.01) |
| *G01R 33/48* | (2006.01) |
| *G06N 20/00* | (2019.01) |
| *G16H 10/60* | (2018.01) |
| *G16H 20/30* | (2018.01) |
| *G16H 20/40* | (2018.01) |
| *G16H 30/20* | (2018.01) |
| *G16H 30/40* | (2018.01) |
| *G16H 40/67* | (2018.01) |
| *G16H 50/20* | (2018.01) |
| *G16H 50/70* | (2018.01) |
| *G16H 15/00* | (2018.01) |

(52) U.S. Cl.
CPC ............... *A61B 5/24* (2021.01); *A61B 5/372* (2021.01); *A61B 5/4064* (2013.01); *A61B 5/7267* (2013.01); *A61B 34/10* (2016.02); *G01R 33/4806* (2013.01); *G06N 20/00* (2019.01); *G16H 10/60* (2018.01); *G16H 20/30* (2018.01); *G16H 20/40* (2018.01); *G16H 30/20* (2018.01); *G16H 30/40* (2018.01); *G16H 40/67* (2018.01); *G16H 50/20* (2018.01); *A61B 2034/105* (2016.02); *A61B 2034/107* (2016.02); *G16H 15/00* (2018.01)

(58) Field of Classification Search
CPC ..... A61B 5/055; A61B 5/4836; A61B 5/7267; A61B 5/4064; A61B 5/165; A61B 5/7264; A61B 5/0006; A61B 5/0022; A61B 5/4088; A61B 5/316; A61B 5/4848; A61B 8/0808; A61B 5/372; A61B 5/7275; A61B 5/1118; A61B 5/24; A61B 5/742; A61B 5/375; A61B 5/0042; A61B 5/6868; A61B 2576/026; A61B 34/10; A61B 2034/105; A61B 5/14553; A61B 5/246; A61B 2034/104; A61B 5/05; A61B 5/7271; A61B 5/00; A61B 5/02; A61B 5/748; A61N 1/36082; A61N 1/36025; A61N 1/36139; A61N 1/37247; A61N 1/36135; A61N 1/36034; A61N 1/36031; A61N 1/36132; A61N 1/3603; A61N 1/00; A61N 1/37; A61N 1/08; A61N 1/36; A61N 1/37

See application file for complete search history.

(56) References Cited

U.S. PATENT DOCUMENTS

| | | |
|---|---|---|
| 9,754,371 B2 | 9/2017 | Kateb et al. |
| 10,098,564 B2 | 10/2018 | Sela et al. |
| 10,506,962 B2 | 12/2019 | Graham et al. |
| 2013/0030276 A1 | 1/2013 | McIntyre et al. |
| 2013/0060305 A1 | 3/2013 | Bokil |
| 2013/0211238 A1 | 8/2013 | deCharms |
| 2017/0049377 A1* | 2/2017 | Littell ................... A61B 5/032 |
| 2017/0193158 A1 | 7/2017 | Heindl et al. |
| 2018/0133507 A1 | 5/2018 | Malchano et al. |

OTHER PUBLICATIONS

Bernard et al., "Using a Virtual Reality Social Network During Awake Craniotomy to Map Social Cognition: Prospective Trial", Journal of Medical Internet Research, Jun. 2018, 20(6):e10332, 5 pages.

Garcea et al., "Direct Electrical Stimulation in the Human Brain Disrupts Melody Processing", Current Biology, Sep. 2017, 27:2684-2691.

Mahon et al., "Translational Brain Mapping at the University of Rochester Medical Center: Preserving the Mind Through Personalized Brain Mapping", Journal of Visualized Experiments, Jun. 2019, 11 pages.

PCT International Search Report and Written Opinion in International Application No. PCT/US2019/064015, dated Feb. 18, 2020, 8 pages.

PCT International Preliminary Report on Patentability in International Application No. PCT/US2019/064015, dated May 25, 2021, 7 pages.

Decision to Grant in European Appln No. 19890320.5, mailed on Sep. 28, 2023, 2 pages.

Extended European Search Report in European Appln No. 23205188.8, dated May 6, 2024, 6 pages.

Intention to Grant in European Appln No. 19890320.5, mailed on May 9, 2023, 8 pages.

Intention to Grant in European Appln No. 19890320.5, mailed on Nov. 30, 2022, 9 pages.

Intention to Grant in European Appln No. 23205188.8, mailed on Jan. 15, 2025, 9 pages.

Office Action in Australian Appln No. 2019389171, mailed on Jun. 26, 2024, 3 pages.

Office Action in Canadian Appln No. 3121207, mailed on Apr. 11, 2024, 3 pages.

\* cited by examiner

DATA PROCESSING SYSTEM FOR GENERATING PREDICTIONS OF COGNITIVE OUTCOME IN PATIENTS

CLAIM OF PRIORITY

This application is a National Stage application under 35 U.S.C. § 371 of International Application No. PCT/US2019/064015, filed on Dec. 2, 2019, which claims priority under 35 U.S.C. § 119 (e) to U.S. Provisional Application Ser. No. 62/917,258, filed on Dec. 1, 2018, the entire contents of which are hereby incorporated by reference.

GOVERNMENT SUPPORT CLAUSE

This invention was made with United States government support under NS076176 and NS089609 awarded by the National Institutes of Health and BCS-1349042 awarded by the National Science Foundation. The U.S. government has certain rights in the invention.

TECHNICAL FIELD

This application relates to data acquisition, collection, processing, and analysis to generate a visualization representing predicted effects on a patient of one or more treatments to the brain of the patient. More specifically, the system is configured to generate predictions about patient outcome in the future and display those predictions in the format of a three dimensional brain and other formats.

BACKGROUND

For over 60 years, intraoperative electrical stimulation in awake patients has been the gold standard for mapping functions in the human brain. During awake mapping, the patient is alert and comfortably positioned on the operating table. Local anesthetic is used to numb the area of incision, and the patient is awake for at least part of the period during the surgery when their brain is exposed. The patient can then be engaged in cognitive, sensory or motor tasks while the surgeon stimulates the brain with a bipolar electrical stimulator at low current (typically 1 to 15 milliamps). A similar procedure is used in patients with implanted electrodes who are undergoing localization of epileptogenic tissue—the same electrodes used to detect the onset of seizures can be used to stimulate the brain. For this application of electrical stimulation mapping, the procedure is carried out in a patient's hospital room rather than an operating room. The goal of electrical stimulation mapping, as a clinical procedure, is to identify where stimulation disrupts the patients ability to carry out a given task. For instance, the primary motor representation for the hand can be localized by identifying the region that when stimulated disrupts the patient's ability to move their fingers. Regions of the brain critical for language ability can be localized by testing for disruption of (for instance) a patient's ability to name pictures, read words, or repeat sentences. Once surgeons have identified the critical brain regions via intraoperative or extra-operative electrical stimulation mapping paired with cognitive testing, the surgeons can formulate an operative plan to remove pathological tissue while not resecting brain regions that are critical for whatever cognitive function needs to be preserved. This basic approach, of using electrical stimulation mapping to generate causal evidence about the role of specific brain regions in specific cognitive functions, can be used to treat a range of neurological diseases, including resection of brain tumor, epileptogenic tissue, or correction of arteriovenous malformations.

However, despite the tremendous advances in image-guided and stereotactic neurosurgery over the last decade, an integrated hardware-software solution is needed that allows for flexible cognitive testing of patients, and which seamlessly interfaces with the other technologies standardly found across operating rooms. Just about every major medical center in the world carries out awake mapping, and the 'standard-of-care' is that someone, a nurse or neuropsychologist or technician, crawls up under the draping and shows images or words for patients to name or read either in the format of a paper pencil test or a tablet. However, the behavioral consequences of electrical stimulation mapping are not recorded, scored and integrated with other data streams that exist (or that will exist) about the patient. One solution to this problem is a system that is configured to integrate patient's behavioral performance with structural and functional magnetic resonance imaging (MRI), electrocorticography, computed tomography (CAT), and other imaging techniques.

SUMMARY

The system described in this document is configured to measure data about the brain of a patient and predict effects on the patient of one or more treatments to the brain. More specifically, a mapping visualization system is configured to receive data (such as pre-operative data) about one or more regions of the brain of the patient from the sensors of the system.

Generally, neurosurgical interventions to remove brain tumors or epileptogenic tissue adjacent to brain areas that support critical cognitive functions must balance the clinical objective of the surgery (remove as much tumor, or epileptogenic tissue as possible) against damage to healthy tissue that could cause neurologic deficits. In the context of brain tumor surgery, this balance is referred to as the onco-functional balance. On the 'onco' side of the balance, surgeons want to remove as much of the tumor as possible, as rates of 'gross total tumor resection' are linked to longer survival. On the 'functional' side, removal of tumors can damage cortical and subcortical substrates of cognition; post-operative difficulties can involve language, action, vision, hearing, touch or movement, depending on the neural system(s) affected. The onco-functional balance is important because increased morbidity is associated with i) lower quality of life, ii) increased post-operative complications that can increase mortality (e.g., patients who can no longer move are at a higher risk of blood clots). The tension inherent in the 'onco-functional' balance in the setting of brain tumor surgery translates as well to epilepsy surgery—there the balance is between the clinical objective of removing all tissue that is generating seizures, while not removing tissue that supports critical functions. More generally, this translates to any invasive neurosurgical procedure that may risk damage to eloquent structures.

At a broad level, functional neuroanatomy is highly stereotyped from individual to individual. However, there can be a high degree of individual variability in the precise (i.e., mm to mm) location of higher cortical functions. In addition, it is generally recognized that the presence of cortical or subcortical pathology can spur cortical reorganization, although the principles that drive such reorganization are poorly understood. Neurosurgical interventions proceed millimeter by millimeter. The system is configured to map each patient's brain, in detail and with sensitivity and precision, in order to understand which regions in that specific patient support which sensory, cognitive and motor functions.

To overcome the above problems, the system described in this disclosure is configured to map the patient's brain in detail from many different data streams for that patient (and in some cases, for classes of similar patients). The system provides a detailed visualization of the patient's brain showing regions in which there is a high risk of adverse patient outcomes overall in response to a treatment (such as removal) of that region.

The system described herein has one or more of the following technical advantages. The system is able to predict the effects of treatments to a patient's brain and provide a visualization of predicted consequences for cognitive outcome for a given treatment. The system can perform a simulation of a surgery to enable a surgeon to determine the expected cognitive outcome for a patient for a given surgical plan, in advance of or during a surgery. The system can combine data from different data streams into a common data source, and use the various data streams together to model outcomes.

In an aspect, the system can include a client standalone application that is capable of acquiring data through audio/video recordings and user interactions. These data are a reflection of the patient's interaction with respect to a suite of predefined tests (in the client standalone application) that measure different cognitive skills that are considered relevant to identify the activation of different regions of the brain. Once the data has been collected from multiple sources, the client standalone application sends the raw data to a store (e.g., a data consortium) through a network. A computing device (such as a backend server) transforms the raw data obtained from the data consortium into a consolidated-structured dataset that enables the process of predictive analytics. One or more models (such as machine learning, deep learning or statistical models subsequently described in further detail) of the system receive the vectorized dataset (or predictor variables) and generate (based on the patient's records and other patients' records with similar cognitive issues), for the region of the brain, a prediction value of an effect of a treatment on that region of the brain. The backend server generates a visual representation of the patient's brain using the prediction values for different regions. The backend server sends the predictions back to the client standalone application through the network. For example, the visualization may indicate regions of the brain of the patient that could potentially be removed during a surgical operation or that are safe (or relatively safe) for removal during a surgical operation. In this example, such a determination can be made when a prediction value satisfies a threshold. In this example, the prediction value can indicate a likelihood that there are adverse effects to a patient's functionality for a behavior or combination of behaviors (e.g., speech behavior, motor behavior, etc.).

In some implementations, the system (e.g., the backend server) trains the predictive analytics based on data collected from other patients, such as data from the data consortium. For example, data are collected by the system (or instances of the system) for different patients. The system organizes those data (e.g., in the data consortium) and configures the data as inputs to predictive models such that a prediction can be made for the current patient. Generally, the data consortium is too large to be stored in the local application of the system, and so some or all of the predictive analytics processing can be offloaded to the cloud. The local device of the system can gather additional patient data, update computations in the cloud, and display the results of those non-local computations to the medical service provider and/or the patient.

Furthermore, the system has practical advantages. The system can be mobile and have a small footprint in what is often a crowded-operating or hospital room of a patient. It is possible to access data and patient information as well as run simulations using a web-based interface that does not require installation of the local application. In addition, the client standalone application can also show in a dashboard screen the visualization model outcome that comes from the backend server. The system can be repositioned in the changing environment of the operating room, as well as compatible across different operating rooms, hospital rooms, and so forth. The system interface with the patient (monitor, microphones, video camera, etc.) are adaptable in real time to the changing ergonomics of the patient as the operation precedes, including changes in the positioning of the operating table throughout the surgery. The system can accommodate patients in different positions on the table (e.g., laying on their side, supine) and so forth (e.g., depending on the location of a brain lesion).

Additionally, the software of the application of the client device is flexible in its operation to allow for online adjustment of the speed of testing. The system allows a provider to switch between different experimental paradigms on the fly (e.g., during the treatment), and to be able to adjust all aspects of stimulus presentation (e.g., duration, loudness) as well as audio and video feedback to the provider of the patient performance. The system is configured to automatically time-stamp and temporally co-register all data streams to permit both offline quantitative analysis after the case and real-time integration of data generated during the current case (in the service of real-time predictive analytics). This serves both to provide new information that is clinically actionable during the procedure and supports scientific inquiry based on data. generated during electrical stimulation mapping. The system can send this data (anonymized) to a data consortium for storing, training and testing models across all instances of the system, improving patient outcomes as more data are provided for training the models.

In an aspect, the system includes at least one sensor configured to generate sensor data representing a behavior of at least one region of the brain of the patient; a data storage storing mapping data that maps a prediction value to the at least one region of the brain. The prediction value is indicative of an effect on a behavior of the patient responsive to a treatment of the at least one region of the brain of the patient, the mapping data being indexed to a patient identifier. The system includes at least one processing device configured to receive the sensor data from the at least one sensor, The at least one processing device configured to perform operations including retrieving the mapping data indexed to the patient identifier; receiving, responsive to an application of a stimulation to the at least one region of the brain, sensor data representing behavior of at least one region of the brain. The operations include executing a model that updates, based on the sensor data, the prediction value for the at least one region of the brain. The operations include updating, responsive to executing the model, the mapping data by including the updated prediction value in the mapping data. The operations include outputting, a visual representation of the updated mapping data including the updated prediction value.

In some implementations, the mapping data include, for each region of the brain including the at least one region, a feature vector representing at least one feature having a value, the updated prediction value being a function of the value of the at least one feature. In some implementations, the feature vector represents a plurality of features each having a value, and the updated prediction value is a function of each value of the plurality of features.

In some implementations, the updated prediction value is a function of one or more first values of respective features represented by a first feature vector of a first region including the region and one or more second values of respective features represented by a second feature vector of a second region neighboring the first region.

In some implementations, the at least one feature represents functional magnetic resonance imaging (fMRI) activity of the brain. In some implementations, the at least one feature represents a functional connectivity of the region of the brain to a core language center of the brain. In some implementations, the at least one feature represents structural connectivity of the region of the brain to a. core language center of the brain. In some implementations, the at least one feature represents a behavioral performance of the patient when the region of the brain is stimulated with direct electrical stimulation mapping. In some implementations, the at least one feature is common to all regions of the brain of the patient, and where the at least one feature represents one of a patient demographic, a tumor type, a pre-operative level of a cognitive task, or a combination thereof.

In some implementations, the sensor data comprises one or more of audio data. electroencephalogram (EEG) data, video data, or a combination thereof. In some implementations, the audio data comprises speech data from the patient, speech data from a medical service provider, or a combination thereof. In some implementations, the video data comprises at least two video streams recorded simultaneously. In some implementations, the model is configured to allow the at least one processing device to execute the model and to update the mapping data in real-time during a surgical operation based on the sensor data received during the surgical operation. In some implementations, the at least one region of the brain corresponds to a voxel of a magnetic resonance imaging MRI image.

In some implementations, the visual representation comprises a three dimensional image of the brain of the patient including an indication of at least one target region of the brain for removal. In some implementations, the operations include retrieving pre-operative data associated with the patient identifier, the pre-operative data representing a state of the brain of the patient for the at least one region prior to a treatment, where executing the model is based on the pre-operative data. In some implementations, the pre-operative data comprises a vasculature model of the brain, and executing the model comprises updating the prediction value responsive to receiving sensor data for updating the vasculature model of the brain.

In some implementations, the effect on the behavior of the patient responsive to the treatment of the at least one region of the brain comprises an estimation of an activity deficit after the treatment for that region of the brain.

In some implementations, the visual representation is configured for transmission to a remote medical service provider during a surgical operation.

In some implementations, the treatment comprises surgical removal of the at least one region of the brain.

In some implementations, the application of the stimulation to the region of the brain comprises administration of a drug to the patient, application of an electrical signal to the patient, or a combination thereof.

In an aspect, a method for generating predictions of cognitive outcome in patients includes receiving sensor data representing a behavior of at least one region of the brain of the patient; retrieving mapping data that maps a prediction value to the at least one region of the brain, the prediction value being indicative of an effect on a behavior of the patient responsive to a treatment of the at least one region of the brain of the patient, the mapping data being indexed to a patient identifier; and receiving, responsive to an application of a stimulation to the at least one region of the brain, sensor data representing behavior of at least one region of the brain; executing a model that updates, based on the sensor data, the prediction value for the at least one region of the brain; updating, responsive to executing the model, the mapping data by including the updated prediction value in the mapping data; and outputting, a visual representation of the updated mapping data including the updated prediction value.

In an aspect, one or more non-transitory computer readable media store instructions that, when executed by one or more processing devices, are configured to cause the one or more processing devices to perform operations including receiving sensor data representing a behavior of at least one region of the brain of the patient; retrieving mapping data that maps a prediction value to the at least one region of the brain, the prediction value being indicative of an effect on a behavior of the patient responsive to a treatment of the at least one region of the brain of the patient, the mapping data being indexed to a patient identifier; and receiving, responsive to an application of a stimulation to the at least one region of the brain, sensor data representing behavior of at least one region of the brain; executing a model that updates, based on the sensor data, the prediction value for the at least one region of the brain; updating, responsive to executing the model, the mapping data by including the updated prediction value in the mapping data; and outputting, a visual representation of the updated mapping data including the updated prediction value.

The details of one or more embodiments are set forth in the accompanying drawings and the description below. Other features and advantages will be apparent from the description and drawings, and from the claims.

DETAILED DESCRIPTION

Figure 1:
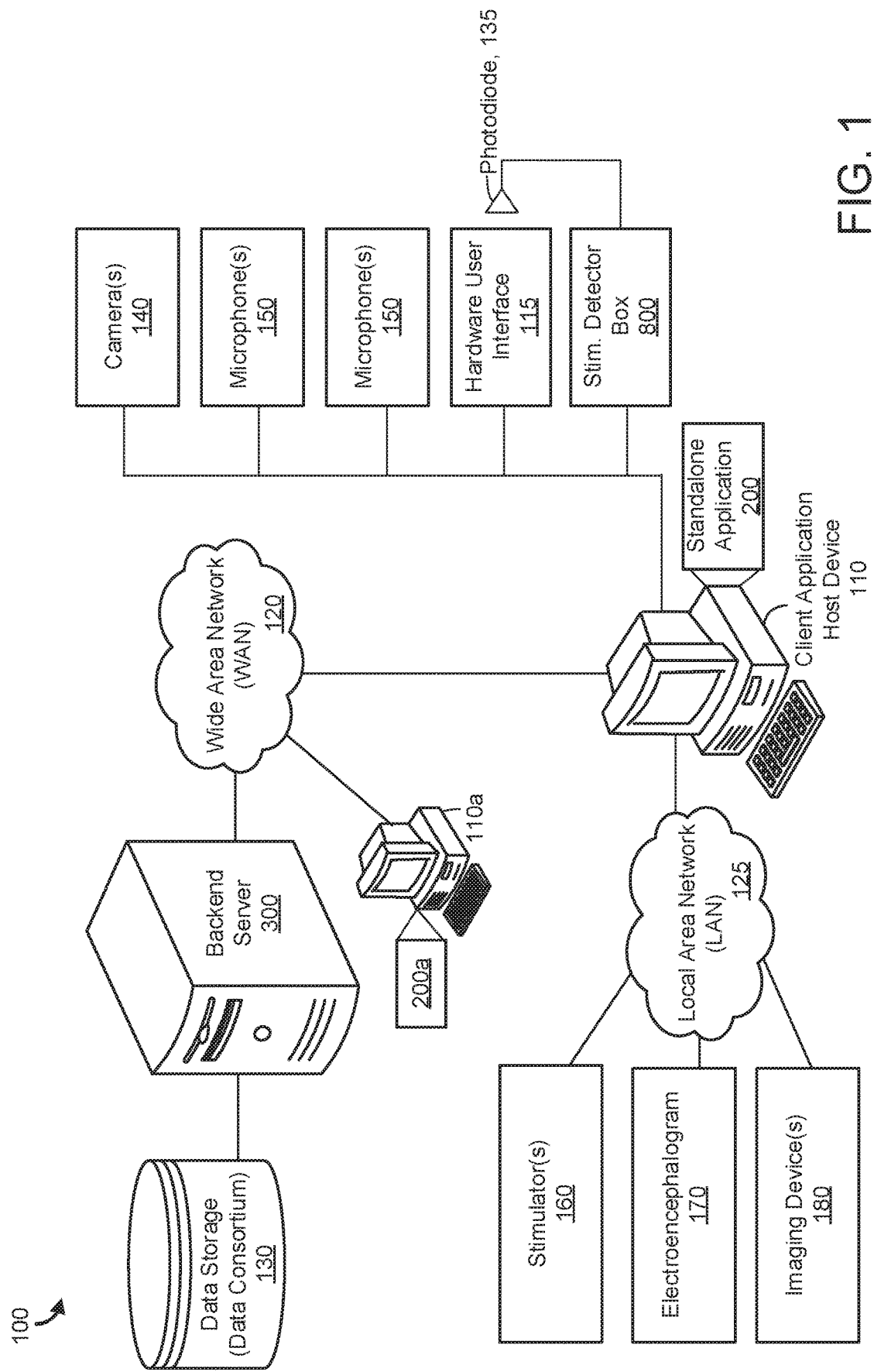
FIG. 1 is a block diagram of an example of a computing environment for a client standalone application, and the backend server configured to output a visual representation of a brain of a patient.

FIG. 1 is a block diagram of an example of a computing environment 100 for a data processing system 300 (e.g., a backend server) configured to generate a visual representation of a brain of a patient and the client device host 110 hosting a standalone application 200 to collect data and display that visualization for output on a user interface (such as a patient dashboard). The client host device 110 is configured to interface over a local area network 125 and a wide area network 120 with other hardware elements of the environment 100 to form a data processing system, The system is configured to measure data about a brain of a patient and predict effects on the patient from one or more treatments of the brain, such as (e.g., electrical stimulation mapping, craniotomy, and so forth. More specifically, the client standalone application 200 is configured to gather and receive data (such as pre-operative data) about one or more regions of the brain of the patient from the sensors of the system.

These different data-streams are stored in the local storage 206 of the standalone application 200 for further processing. Generally, before data preprocessing, the client standalone application 200 anonymizes the data by cleaning, and deleting some of the metadata that corresponds to personally identifiable information (PII). This process also affects patient images in which the identity of the subject can be unveiled. In order to comply with the Protected Health Information defined by HIPAA, the anonymization process affects the following categories: 1. Names; 2. Locations: All geographic subdivisions smaller than a state, including street address, city, county, precinct, zip code, and their equivalent geocodes, except for the initial three digits of a zip code if the corresponding area contains more than 20,000 people; 3. Dates: (i) All elements of dates (except year) for dates directly related to an individual, including birth date, admission date, discharge date, date of death. (ii) All ages over 89 and all elements of dates (including year) indicating such an age; 4. Telephone numbers; 5. Fax numbers; 6. E-mail addresses; 7. Social security numbers; 8. Medical record numbers; 9. Health plan beneficiary numbers; 10. Account numbers; 11. Certificate/license numbers; 12. Vehicle identifiers and serial numbers, including license plate numbers; 13. Device identifiers and serial numbers; 14. Web Universal Resource Locators (URLs); 15. Internet Protocol (IP) address numbers.

Once the data have been anonymized, the client standalone application will trigger a signal to the Upload Module to send the data over the Network 120 to the Data Consortium 130. Then, the backend server 600 will receive a notification that it has to make a query to the Data Consortium 130, so that it can gather different anonymized data-streams that will be filtered based on different aspects such as the region of interest of the brain from the patient and from other patients. All these data will be preprocessed, to have a clean and coherent data corpus that will eventually be used to generate the models to perform predictions.

As part of the Model Training module, the system transforms the data into feature data by applying a feature vectorization process. One or more models (such as machine learning models subsequently described in further detail) of the system receive the feature valorized data and generate, for (a) relevant region(s) of the brain, a prediction value of an effect of a treatment on that region of the brain. The backed server 300 generates a visual representation of the brain of the patient using the prediction values for different regions. For example, the visualization may indicate regions of the brain of the patient that should be removed during a surgical operation or that are safe for removal during a surgical operation. In this example, such a determination can be made when a prediction value satisfies a threshold. The threshold can be defined, in part, based on historical data from different patients that successfully recovered from similar medical procedures. In this example, the prediction value can indicate a likelihood that there are adverse effects to a patient's functionality for a behavior or combination of behaviors (e.g., speech behavior, motor behavior, etc.). When used in an intra-operative setting, the 3D visualization is registered to and in the same orientation as the patient's brain on the operating table.

In an aspect, the visualization shows regions of the brain with a representation of the prediction values. For example, the visualization can include a three dimensional (3D) representation of the brain. Prediction values for one or more regions of the brain can be represented as a heat map overlaid on the representation of the brain, a numerical output, region identification, or other such representations. In some implementations, the visualization can include a list of regions that are candidates for treatment based on the prediction values.

In an aspect, the system receives additional data related to treatment of the patient and updates the visualization. The treatment of the patient can include a surgical operation on the brain (including a surgical removal of the region), administration of a drug to the patient, application of a therapy, or some other such treatment. For example, the backend server can request an anonymized electroencephalogram 170, data from imaging devices 180 such as a magnetic resonance image (MRI), and input data from the standalone application 200, such as data received through a user interface (e.g., interface 1000 of FIG. 10) of the client standalone application 200. Each of these components are subsequently described in further detail. When the additional data are received, the data processing system 300 can generate updated prediction values for the one or more regions of the brain and subsequently update the visualization.

The application 200 also receives data indicating the location of the electrical stimulation for a given trial, The location is associated with the behavioral consequence of that stimulation. Generally, the location of stimulation is provided by, in the instance of intraoperative use, connectivity/interactions with cranial navigation systems already present in all operating rooms. Generally, the location of stimulation is provided by, in the instance of bedside testing of epileptic patients implanted electrodes, prior imaging that has been processed (CT and/or MRI).

In an aspect, the data processing system 300 is configured to send updates about the visualization during the treatment (e.g., surgery, bedside cognitive mapping, drug therapy, radiation treatment, laser ablation, etc.) of the patient to the client standalone application 200. The data processing system 300 updates the prediction values mapped to the regions of the brain in response to receiving additional data (such as operative data) about one or more regions of the brain. For example, during a surgical operation on the brain of the patient, the application 200 receives sensor data from sensors such as one or more cameras 140, one or more microphones 150, one or more electrical stimulators 160, and so forth. As sensor data are received (after being anonymized and uploaded into the Data Consortium 130), the backend server application 3 00 transforms received data in to feature data and executes the model(s) on the feature data. The set of models applied to the new data is based on previously trained models that have been developed, evaluated and tested by a group of experts in neuroscience. This group of experts includes researchers, analysts, neurosurgeons, psychologists, psychometrists, neuroscientists, and other experts in the field. The data processing system 300 updates the prediction values for the effects of the treatment on the region of the brain of the patient using the outputs of the models from the operative feature data based on data received from the application 200. For example, during a surgical operation, a surgeon might stimulate regions of the brain of the patient using the stimulator 160 and record a patient response. The response may indicate a function of that region. For example, the response might indicate that the region of the patient's brain is a core language region. The response data received from the patient (e.g., speech data) is transformed in to feature data (along with the corresponding set of data from other data sources) that are input into a model to update the prediction value for that region. For a surgical operation, the prediction value can be an estimation of a deficit of the patient in response to removal of that region of the brain. How the data from the sensors are acquired by the client application 200 is described in further detail with respect to FIG. 2. In addition, how the data is processed by the backend server 300 is described in further detail with respect to FIG. 3.

In some implementations, the environment 100 includes a surgical environment, such as an operating room. In some implementations, the environment 100 includes an operating room and one or more other locations remote from the operating room, such as different rooms in a treatment center, hospital, research laboratory, private company, and so forth. In some implementations, the environment is a patient's hospital room, or an outpatient testing facility. In some implementations, the system, including the application 200 and client device 110, has a small footprint that is suitable for an operating environment. The system is also suitable for real-time adaptation to changing ergonomics of a patient as an operation proceeds, or as patient positioning in a bed changes. Details as to the physical configuration of the hardware elements of the system are described in relation to FIG. 9.

The client application 200 is configured to communicate with a backend server over the WAN network 120. Generally, the client device 110 comprises a computing device that is configured to receive input (e.g., through a user interface) from a user for interacting with the application 200. In some implementations, the client device 110 and the data processing system 300 are separate computing systems (e.g., a client-server system or cloud-based system). In some implementations, the client device 110, the client application 200 and the data processing system 300 can be incorporated in a single computing system.

The client application 200 can function as a front-end device for accessing the backend server application 300 in a client-server relationship. For example, a medical service provider (or other user) can access the backend application 300 through the user interface of the client application 200 during treatment (e.g., a surgical operation). In some implementations, the client application 200 can be installed for execution on the client device 110 that is configured to interface with data processing system 300 and/or the data storage 130. In some implementations, the client device 110 can access a web portal that allows the user to enter login credentials for accessing the client application 200 or the data store 130. The client application 200 is configured to send data to the data storage 130 when new files are available, such as when a notification/messaging module indicates that local files are waiting for transmission to the data storage 130, or there are updated predictive values, test materials, software updates, or test protocol changes that need to be returned to the client application 200.

The system includes a data storage 130 that is accessible by the other devices (such as the client device 110 and the application 200) over the WAN network 120. The data storage 130 is configured to store data that are used for generating the visualization of the brain of the patient or for training and testing models based on prior patients studied and used to generate the visualization of predictive analytics. Each patient is assigned a profile that is stored in the data storage 130. The profile can be indexed to a unique patient identifier. The profile can include the data (e.g., sensor data) measured from the patient. As additional sensor data are measured for the patient (e.g., additional MRI or cognitive tests are performed, etc.), the patient's profile data are updated and can be expanded as needed, which makes the storage system flexible enough to adapt to different conditions based on the patient's data availability. The application 200 can then update the visualization for the patient receiving the outcomes coming from the backend server 300 models applied to the additional sensor data. The models can be continually trained or updated by data received from the patient, as well as from other patients (in the past, or contemporaneously at other sites). In some implementations, the models can be updated using data received for other patients. In other implementations, the models are based on data corpus from a specific patient. The models are described in further detail with respect to FIGS. 6-8. In some implementations, the data storage 130 is configured to store data uploaded "as-is," in the respective format. However, the data storage 130 can be configured to store data in different ways depending on the format of the data. For example, media files can be stored in a hierarchical file system, while MRI data are stored in a brain imaging data structure (BIDS) format. In some implementations, the data storage 130 includes a non-relational database for fast query and real-time analytics. In some implementations, the data storage 130 is a cloud-based data storage.

The data storage 130 is configured to store data related to many patients to provide a library of data that is accessible by the application 200 and the client device 110 through a web browser application. For example, the data storage 130 can store pre-operative data from different medical service providers or other sources of data. In some implementations, the data storage 130 is a backend data storage, and forms a server-client relationship with the application 200 and/or backend application server 300. In some implementations, the data storage 130 is configured to interface with many instances of the system including the client application 200 and store data in a common location. Generally, an anonymization module anonymizes patient data stored at the data storage 130 if the data are to be accessible by systems other than those related to the patient. For example, if patient data are used to train a model, the data are first anonymized prior to storage in the data storage 130. The communication between the data storage 130 and other devices of the system are conducted using secure, encrypted protocols. In this way, the data storage 130 forms a data consortium that is a common resource for generating visualizations for a plurality of patients by a plurality of instances of the client application 200.

The data storage 130 is optimized for fast retrieval of data so that the application 200 is able to update the visualization of the brain of the patient in real-time during treatment. In some implementations, the data storage 130 can be configured to deliver all data needed for generation of the visualization for local storage by the application 200 prior to the treatment. In some implementations, the data storage 130 can continually provide data to the backend application 300 upon request during the treatment of the patient.

Figure 2:
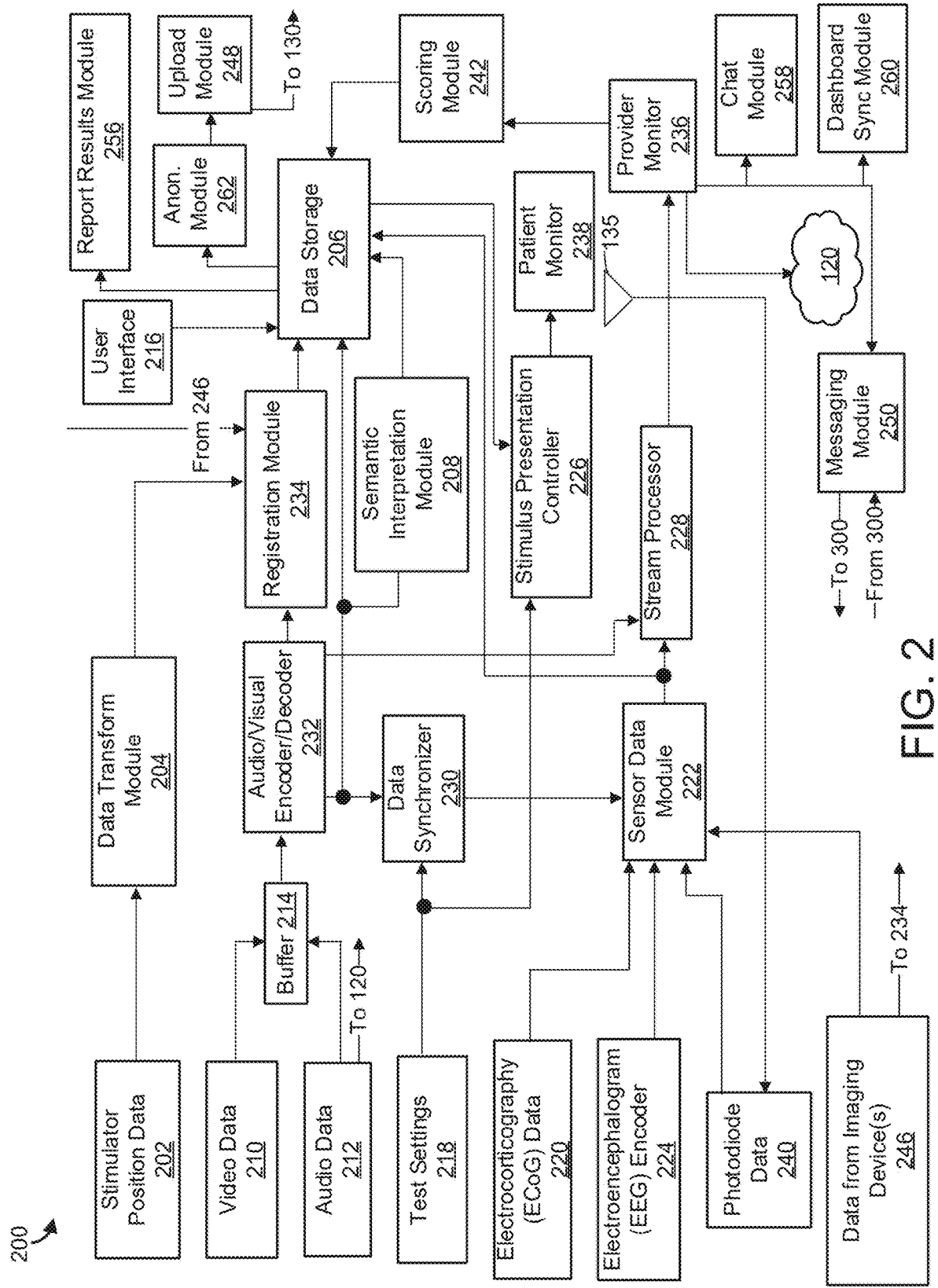
FIG. 2 is a block diagram of the client standalone application configured to output a visual representation of a brain of a patient based on the model created on the backend server.

FIG. 2 is a block diagram of an example application 200 configured to output a visual representation of a brain of a patient. The application 200 is configured to receive data from various data sources (e.g., data streams) before, during, and/or after treatment of the patient. The application 200 is configured for receiving and processing data continuously (or nearly continuously) as data are received from the various data streams during a test of the patient or during treatment of the patient. For example, audio data 212 can be continuously recorded during a cognitive test of the patient, buffered by the buffer 214 if needed, encoded/decoded, time stamped, and stored in a data storage 206 or processed by a processing module, such as a semantic interpretation module 208 for speech recognition, a registration module 234 for MRI-brain registration, and so forth. In an aspect, the application 200, along with the backend application 300, receives the data from the various data streams, associates the data with a region of the brain of the patient (or the entire brain of the patient), integrates/registers temporally extended data with other temporally extended data (e.g., video with audio, audio with electrocorticography), processes the data using one or more models (such as machine learning, deep learning or statistical models), generates prediction values of an effect of treatment on the associated region, and generates a visualization based on the prediction values. The data streams can be processed in parallel by various modules as shown in FIG. 2. Where applicable, the data processing processes can be pipelined.

Various example data streams are now described. This list is illustrative rather than exhaustive—other data streams can be added to increase the accuracy of the prediction values generated by the various models, and displayed and integrated with the visualization or another format. The application 200 can include an application programming interface (API) configured to interface with electronic medical records (EMR) to acquire clinical notes and brain scans from EMR systems. The application 200 is configured to provide a 3D integration of multiple data streams, including: computerized axial tomography (CAT) scan data; resting functional MRI (fMRI) data; task based functional MRI data using (for instance) tasks such as speech production, speech comprehension, speech repetition, reading, picture naming, motor tasks (move fingers, toes), or other paradigms (music processing, arithmetic, visual processing, etc.), user interface responses (button presses, eye movements, kinematic profiles of reaching actions, etc.), diffusion tensor imaging (DTI); diffusion spectrum imaging (DSI); tumor/standing lesion location data (e.g., in the format of a mask); transcranial magnetic stimulation (TMS) points and associated behavioral effects; angiography of brain vasculature; magnetoencephalography (MEG) data; electrocorticography (ECoG) data; electrical stimulation mapping coordinates streamed from a cranial navigation system and associated behavioral responses; electrode location data for any electrical stimulation mapping (e.g., as in stereo EEG, grids or strips for recording from and stimulating the brain); skull shape; cortical thickness maps; anatomical atlases in various stereotactic spaces; Montreal Neurological Institute (MNI) brain space coordinates; Talairach space coordinates; native space coordinates; all relevant transformation matrices among different spaces, and any combination thereof.

In addition to the data streams previously described, the application 200 can be interfaced with other sensors for measuring physiological data about the patient. The application 200 can accept as input continuous data (as from an EyeTracker, physiological monitoring of heart rate/respiration during functional MRI, surgery, or bedside testing or kinematic motion capture systems for the hand/arm/body). The application 200 can include an accelerometer based response time. In this case, an accelerometer is gently attached to the surface of a patient's neck to detect speech onsets in noisy environments where microphones may fail. The application 200 can also include electromyographic recordings of the neck, throat, hand, fingers (etc.).

The application 200 spatially registers data received from the various data streams described previously to the corresponding regions of the patient's brain, aligning all data streams into a common space and format. In an aspect, the application 200 is configured to export 3D map features as flat or scaled grey-scale or color in Digital Imaging and Communications in Medicine (DICOM) format or Neuroimaging Informatics Technology Initiative (NIFTI) format for input to standard cranial navigation systems used during surgery (e.g., BrainLab, Stealth, Medtronic, Stryker, etc.) and for input to standard MRI processing systems (e.g., MRICron, FreeSurfer, etc.). In an aspect, during an operation, a stimulator can be used to apply a stimulation to a region of the brain of the patient. Generally, the stimulation includes an electrical stimulation (it could include a cooling device to cool, temporarily, a sub region of the brain). The stimulator position data 202 are recorded. The position data can include neuronavigation data. The position data 202 can be synchronized with activity shown by the brain of the patient that is responsive to the stimulation (such as electroencephalogram (EEG) data), and with the patient's behavioral responses and phenomenology as a function of stimulation. A data transform module 204 receives the position data 202 and stores the data for transformation to a pre-operative space. The transformed data are sent to the data storage 206. The data storage 206 can be included in the data storage 130 data consortium, described previously, and can be displayed in real time via the data visualization dashboard present in the client application 200.

An EEG encoder 224 can be used to receive the EEG data. In parallel, the EEG data can be represented on a provider monitor 236 (e.g., a surgeon's monitor). The patient can be stimulated during one or more cognitive tests (e.g., neuropsychological tests). The test can be presented to the patient on a patient monitor 238.

An electrocorticography (ECoG) sensor can provide ECoG data 220 during a treatment of the patient. The ECoG data 220 are provided to a sensor data module 222 that reads the ECoG data and synchronizes to the data synchronizer 230 for inclusion with other data streams (video, audio, behavior, stimulation parameters, etc.) to the data storage 206, as subsequently described.

During cognitive testing, a treatment, including electrical stimulation paired with a cognitive task (or combination thereof), the patient and/or medical service provider can be monitored with the cameras 140, microphones 150, or both. Video data 210 and audio data are recorded, and, if needed, buffered by an input buffer 214. The buffer 214 can serve various purposes, such as synchronizing data, storing data until a data processing process is ready to receive the data, and so forth. The video data 210 and/or the audio data 212 can be processed by an audio/visual encoder/decoder 232 before being synchronized by a data synchronizer 230. The audio data 212 and the video data 210 are processed by a stream processor 228, which is configured to process the audio data 212 and the video data 210 continuously or nearly continuously. Additionally or alternatively, the audio data 212 and the video data 210 can be sent to one or more processing modules for processing in trial level snippets, and used in accordance with trained models. For example, a semantic interpretation module 208 is configured to extract semantic information from speech signals of the audio data 212 or visual data from the video data 210. The semantic interpretation module 208 can include a machine-learning module that is a pre-trained model (trained based on patient data from the data storage 130). To illustrate, this pre-trained model can be the product of one or more of the machine-learning/deep learning models that were trained by the corresponding backend application module. In this case, the model training module 314. In another example, the audio data 212 and the visual data 210 can be sent to a registration module 234 configured to associate responses in the audio data 212 or the video data 210 with portions of an MRI image (e.g., with regions of the brain of the patient that were stimulated or recorded from coincident with those video/audio time points).

In an aspect, a continuous audio recording of the patient is acquired throughout an entire testing session. The test session can occur in an MRI scanner, in an office prior to or after surgery, in a hospital bed prior to or after surgery, in an operating room (during awake surgery), or in another location. Similarly, a continuous video recording can be performed with two or more cameras. The provider interface 236 provides the medical service provider with an ability to toggle between audio and video (turn audio or video on/off independent of the other streams), as described below. A photo-diode is attached to the patient display monitor 238. The photo-diode streams data to the sensor data module 222 and to the data synchronizer 230, which is the module that time-stamps the onset stimuli (EEG 224 as an example). This provides an objective measure of when in time the stimulus was presented which is used to define trial onset times, and for synchronization with any temporally extended data streams (e.g., video, audio, electrocorticography) Based on those trial onset times, the continuous audio/video streams are spliced into trial level data, which can be indexed and stored in the data storage 206. For example, the application 200 is configured to integrate video data 210, audio data 212, and the stimulus data from the provider monitor 238 into a single data stream that is indexed by trial.

The application 200 can be configured to control how stimulation is applied or presented to the patient. For example, patient stimulation can include electrical signals, as described previously. In another example, the patient can be stimulated using presentation of data on a patient monitor 236. The patient monitor can include a screen. In some implementations, the patient monitor can receive input data (e.g., a touch sensitive screen, as on a tablet or touch sensitive monitor). Likewise, the provider monitor 236 can be an interactive device, such as a tablet computer. The stimulation presentation controller 226 can be used to synchronize presentation of a stimulus to the patient with one or more other data streams.

A user interface 216 is configured to receive input data from one or more of the patient or medical service provider, such as a surgeon or test administrator. In some implementations, the user interface 216 is included in the client device 110.

The provider monitor/interface 236 provides one or more controls that enable the provider to configure a cognitive test for a patient, select or configure data streams, and so forth. For example, the provider may configure a test, and the test settings data 218 are sent to the data synchronizer to synchronize the test and the data streams. The provider monitor/interface 236 can be used by the provider to modify a score module (e.g., a part of modules 208, 234, etc.) based on the response obtained through the scoring module 242, in which the provider can select multiple categories depending on the type of the task. To illustrate, the categories can include: correct, incorrect, and within incorrect, phonological error, semantic error, grammatical error, omission, and so forth. The provider monitor/interface 236 is described in further detail with respect to FIG. 10.

The application 200 is configured to assist a medical service provider in designing and conducting one or more cognitive tests of a patient prior to treatment, during treatment, after treatment, or any combination thereof. The devices and modules of FIG. 2 are configured to collect data from various data streams, process the data streams, and generate a visualization in real-time or near real-time. The updated visualization can assist the medical service provider with the treatment of the patient or influence how the cognitive test is performed on the patient.

When designing a new experiment, the user can define, through the provider monitor/interface 236, the number of factors and levels of each factor for the experimental design. The user can select experimental materials of their own choosing for the experiment. For example, a provider interface can allow the provider to drag and drop data representing stimuli (e.g., pictures, .wav files) into cells of an experimental design. Additional input parameters specify response types for the patient, such as vocal/microphone responses, manual/button box selection, written/Wacom pad input, eye movements/eye tracking, and so forth. The provider can set the duration of each auditory or visual stimulus, the number of repetitions of each stimulus, the time between stimuli and the overall duration of the experiment, and so forth. As another example, the provider can use the client application 200 to design a pseudo-random or truly random order of stimulation presentation for the experiment.

In an aspect, the data storage 206 can store a library of neuropsychological test configurations. A provider can select a test configuration, and the application 200 configures data acquisition from the sensors as needed based on the selected neuropsychological test. In some implementations, the library can be updated with customizable tests that are privately available to a provider or globally available from the data consortium 130 through the backend server 300. The application 200 can periodically update the library of tests with available tests from the data consortium 130 through the messaging/notification module 250. Users can modify available tests to suit their needs.

The library of tests can include the following tests, which represent a non-exhaustive list. In an example, patients complete the following tests before a surgery and at multiple time points after surgery (e.g., 1 month after surgery, 6 months after surgery, and twelve months after surgery). The tests can include, for example, a measure spontaneous speech (e.g., cookie theft picture, Cinderella story, etc.); category fluency test, in which actions, semantic categories, words starting with F, A, and S are produced; word reading and repetition (e.g., nouns, verbs, adjectives, non-words, matched on length and frequency); picture naming; auditory naming; sentence completion; mid and high-level visual tests, such as the Birmingham Object Recognition Battery (BORB); auditory minimal pair discrimination (e.g., "pa" vs. "da," "ga" vs. "ta", and so forth); sentence picture matching including reversible passives; color naming and Farnsworth Munsell hue sorting; face recognition and memory tests, such as the Cambridge face test; verbal learning tests, such as the California verbal learning test; an IQ test such as the Weshler IQ test. While these particular tests are included for illustration, similar variations on these tests and different combinations of these and similar tests are possible.

In an aspect, a test protocol can be developed and saved in the same manner as the cognitive test. A test protocol includes a sequence of tests to perform on a patient. The protocol can be associated with a particular treatment, patient, class of patients, provider, medical center, or be a stand-alone protocol. The protocol can specify which tests to perform (and what sensor data to gather) before, during, and after treatment of the patient for providing mapping of functions to relevant regions of the brain for that patient. For example, when a patient is registered in the system, based on the entered information about the location of a brain lesion, a series of neuropsychological tests are suggested as a testing protocol. The provider can adjust the protocol using either a web-based platform or through the local software application of the application 200. Changes to the protocol can be made in real time, including during testing.

In some implementations, stimulus order for a given experiment is determined prior to initiating the experiment, based on provider input. The interface 236 then enables the provider the opportunity to change the order of upcoming stimuli or to skip an upcoming stimulus using a simple interface where upcoming trials are displayed and a drag and drop means for changing order on the fly.

The application 200 includes a scoring module 242. The provider can score the performance (e.g., behavior) of the patient in real time at the trial level. The provider can designate a response as correct, incorrect, and if incorrect, the nature of the error as it was described above. The real-time human-based scoring can be accomplished through the same interface 236 that is used to run the application 200, and/or through a tablet. In addition, the scoring module 242 includes an interface that allows the scorer to review an integrated video of the patient during testing, audio of the patient, and video of what the patient saw on the stimulus monitor—indexed by trial number, where trials have been pre-scored (in real time).

In some implementations, scoring is performed using crowdsourcing techniques. For example, the application 200 can include a platform for reaction/response time and/or transcription scoring by human users. In an example, When audio data 212 are generated that include, for instance, audio of the patient naming a picture or reading a word, the data 212 are automatically sent to an online platform associated with the application 200. Networked users can score the data 212 for content (e.g., generate a transcription), measure the response time and other temporal aspects (e.g., duration of articulation, etc.), score responses, or perform other scoring operations. While some of these scoring operations can be performed automatically, networked users can perform validation of the scored data. In some implementations, the provider can determine which networked users can view the data (e.g., users associated with the provider, etc.), how many networked users should validate the results, and what type of validation or scoring is requested. The results of online scoring can be controlled by giving networked users control data with known results. The performance/reliability of a given networked user can be based on responses to the control data. In this case, the networked user does not know which data are standard and which are genuine test results, The audio data 212 and the provider monitor data 326 can be connected to the network 120 for crowdsourcing in this way by the networked users.

The application 200 can show results of the test on a cognitive dashboard of the interface 236. The cognitive dashboard includes a user interface that plots (or otherwise displays graphically) patient performance in various domains (e.g., language, executive function, motor function, and so forth). The value obtained for each domain can include a weighted summary statistic across multiple tasks. The cognitive dashboard shows patient performance over time and normalized to various comparison groups. The comparison groups can include other patients, healthy subjects of the same demographic (age, gender, physical condition, etc.), and so forth.

The application 200 is configured for automatic report generation. At the end of cognitive testing, the application 200 automatically organizes the results of testing. The application 200 can organize the results in several ways. First, the application 200 can organize the results into a chart that shows performance levels. Second, the application 200 can organize the results using a comparison to normative standards. The application 200 can write the performance levels into a text document that is a template for a provider's (e.g., the clinical neuropsychologist's) report. The report can be generated by a reporting module 256.

The application 200 is configured for surgical simulation. The application 200 is configured to generate a 3D representation of the patient's brain where parts of the brain can be 'virtually' resected/removed. The application 200 is thus capable of allowing clinicians to simulate a given surgical plan. The application 200 generates expected post-operative cognitive outcomes based on the models created and run by the backend application server 300. For example, a projected cognitive dashboard for a surgical plan is generated. To generate the simulated outcomes, the various models of backend application 300 generate the prediction values for the regions of the brain as described previously.

The application 200 includes a surgical optimization module. The surgical optimization module allows clinicians to identify a more optimal surgical plan from the standpoint of optimizing the projected cognitive dashboard present in 236.

The application 200 is configured to present the predictive analytics obtained in the backend server 300. Predictive models (for instance, machine learning, deep learning and statistical based predictions) of cognitive outcomes after treatment (e.g., surgery) are generated by the server 300. The data streams collected for a patient (e.g., up to the point at which the prediction is made) collectively form the features used for testing (with training of the algorithms based on prior completed datasets from other patients that have been collected). This process is described in further detail with respect to FIG. 4 and FIG. 5.

The application 200 is configured for real-time remote monitoring. For example, an individual that is remote from the patient can observe the patient being tested and can communicate with the provider during testing. For instance, a clinical neuropsychologist might monitor the testing of multiple patients by multiple different psychometricians in this manner. The application 200 can be configured to allow a live chat between the provider and the observer. The observer can be invited to synchronize its dashboard with the provider's dashboard (e.g., by a dashboard synchronization module 260 connected to the provider monitor 236) and communicate with the provider using a live chat window within the system. The chat feature allows both troubleshooting and technical assistance as well as real-time remote monitoring, and can be executed by a chat module 258 connected to the provider monitor 236. Thus, multiple providers using multiple instances of the application, such as application 200a of FIG. 1 on another client device 110a) can participate in the same treatment or communicate during treatments of different patients.

In an aspect, additional surveys can be administered either with tablets (e.g., in clinic waiting room) or via web interface (for home use)—results are automatically integrated with a patient's cognitive dashboard and thus used for treatment simulations and modeling patient outcomes. The application 200 also allows input of surgical milestones (e.g., session notes, time of incision, medications administered, electrical stimulation intensities, changes in patient ability over the session, and so forth). The provider is able to record germane clinical observations and have those observations stored together with the other data in the patient profile. In some implementations, electrode-based clinical notes can be entered by the provider. For example, the application 200 can be used with patients with implanted electrodes undergoing seizure monitoring. The provider, using a data integration tool, can select an electrode represented in the user interface. A text input box appears, allowing the user to take notes that are specific to each electrode. The provider can document, for example, that when the respective electrode is stimulated, the patient reports tasting metal, hearing a musical note, seeing a flash of light, or there are after-discharges.

The application 200 is configured to preserve data entered into the system and ensure that the mapping data are up to date when modeling patient outcomes with the mapping data or prior to a treatment. For example, checkpoints to send data and check workflow are used by the application 200. Each time the application 200 is initialized, and the host computer (e.g., the client device 110) is connected to the internet, there is an automatic check to make sure all data of the patient profile are up to date. For example, a check is performed in the data storage 130 by searching the patient's profile in the data consortium. In addition, specific checkpoints are included. For example, the application 200 can perform a check at midnight on the day of the surgery to make sure that data from each milestone in a patient's care are uploaded to the central repository of the data storage 130.

The application 200 is configured for ease of use and interoperability with existing third party systems and devices. For example, if the device is used to control stimulus presentation during task-based functional MRI, a user can select which software package will be used for analysis (e.g., AFNI, FSL, Brain Voyager, SPM, etc.) and the design matrices of timing of the experiment will be outputted in the appropriate format. The application 200 is configured to accept joystick control of a camera that is on a motorized articulating arm.

The application 200 can be calibrated prior to accepting data streams. For example, test module 218 of the application 200 allows a provider to turn on an input listening system to test, calibrate and adjust inputs (e.g., microphone settings, codes for buttons on a button box, etc.).

The application 200 is configured to gather data about a patient after treatment has occurred. For example, if a surgical operation has been performed, the application 200 is configured to integrate data representing the resection into the 3D mapping data for the patient, and update the visualization accordingly. The application 200 can generate a report at the end of surgery to send to various members of the clinical team that predicts the patient's expected cognitive deficits (projected cognitive dashboard). This can be compared to actual outcomes measured from the patient over time. The feedback obtained from this process can be integrated into the backend server testing/training modules in order to reduce future discrepancies between predicted and observed outcomes.

The application 200 also includes an upload module 248 and a messaging module 250. The messaging module 250 communicates with the backend server 300. The data send from the data storage 206 are anonymized before uploading by the upload module 248 (e.g., by an anonymizing module 262). The upload module 258 uploads the patient's data to the data consortium 130.

Figure 3:
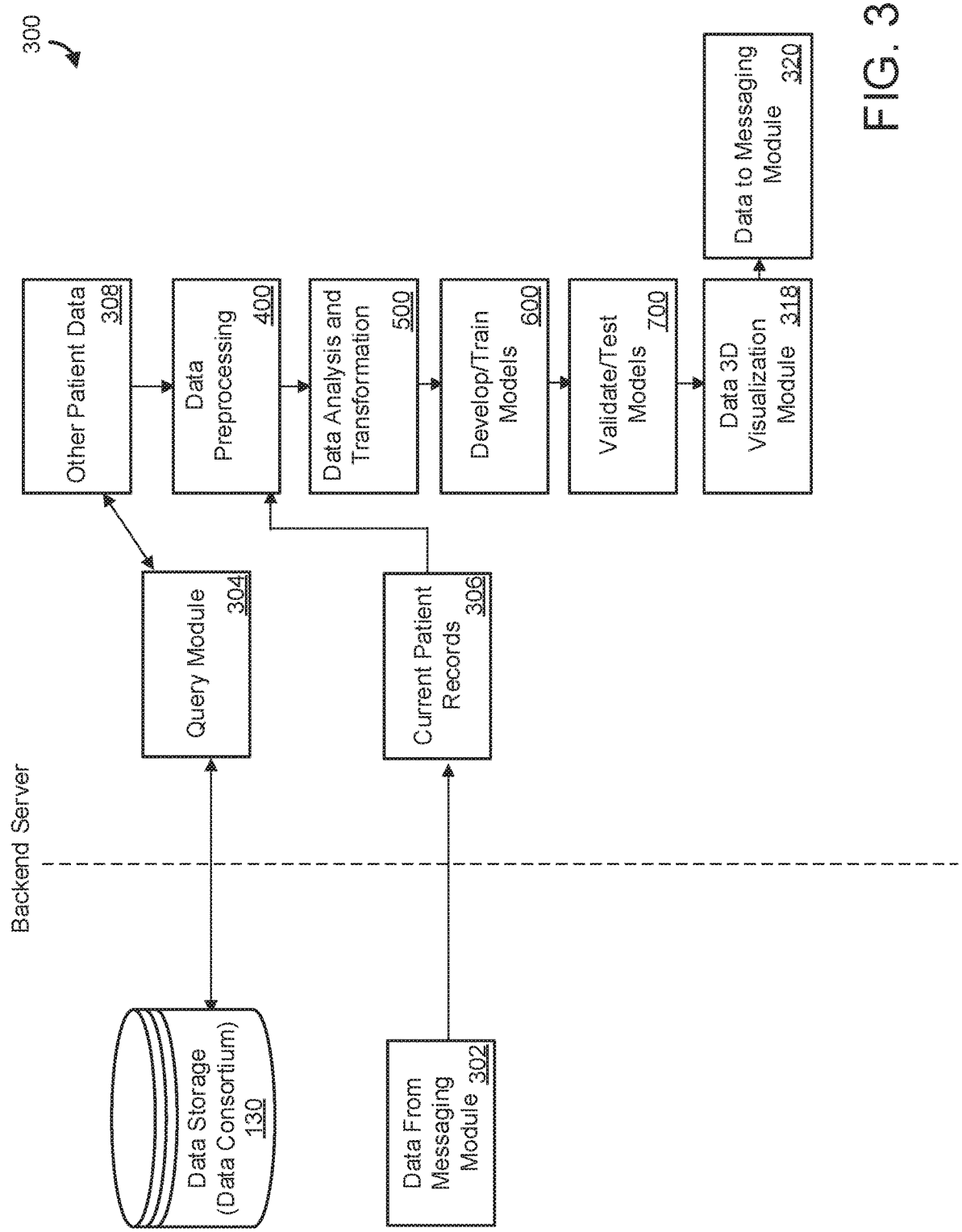
FIG. 3 is a block diagram of the backend server that is configured to output a visual representation of the brain.

FIG. 3 is a block diagram of the backend server 300 that is configured to output a visual representation of the brain for rendering and displaying by the host device 110. The backend server 300 receives data from the consortium 130 and data 302 from the messaging module 250 of the application 200 described in relation to FIG. 2. A query module 304 can request data from the consortium 130 as needed for updating or generating predictions for a patient in real time or near real time. The query module 304 can also request the data 308 of other patients for use in the predictive models of the data processing system 300. The patient data 306 and other patients' data 308 are preprocessed by a preprocessing module 400 as described in relation to FIG. 4. The preprocessed data are then sent to a data analysis and transformation module 500, described in relation to FIG. 5. The data are used for developing and training models, as described in relation to FIG. 6. The models are tested and validated, as described in relation to FIG. 7. The data processing system 300 generates a three dimensional (3D) visualization module 318. The data 320 are sent to the messaging module 250 of FIG. 2.

Figure 4:
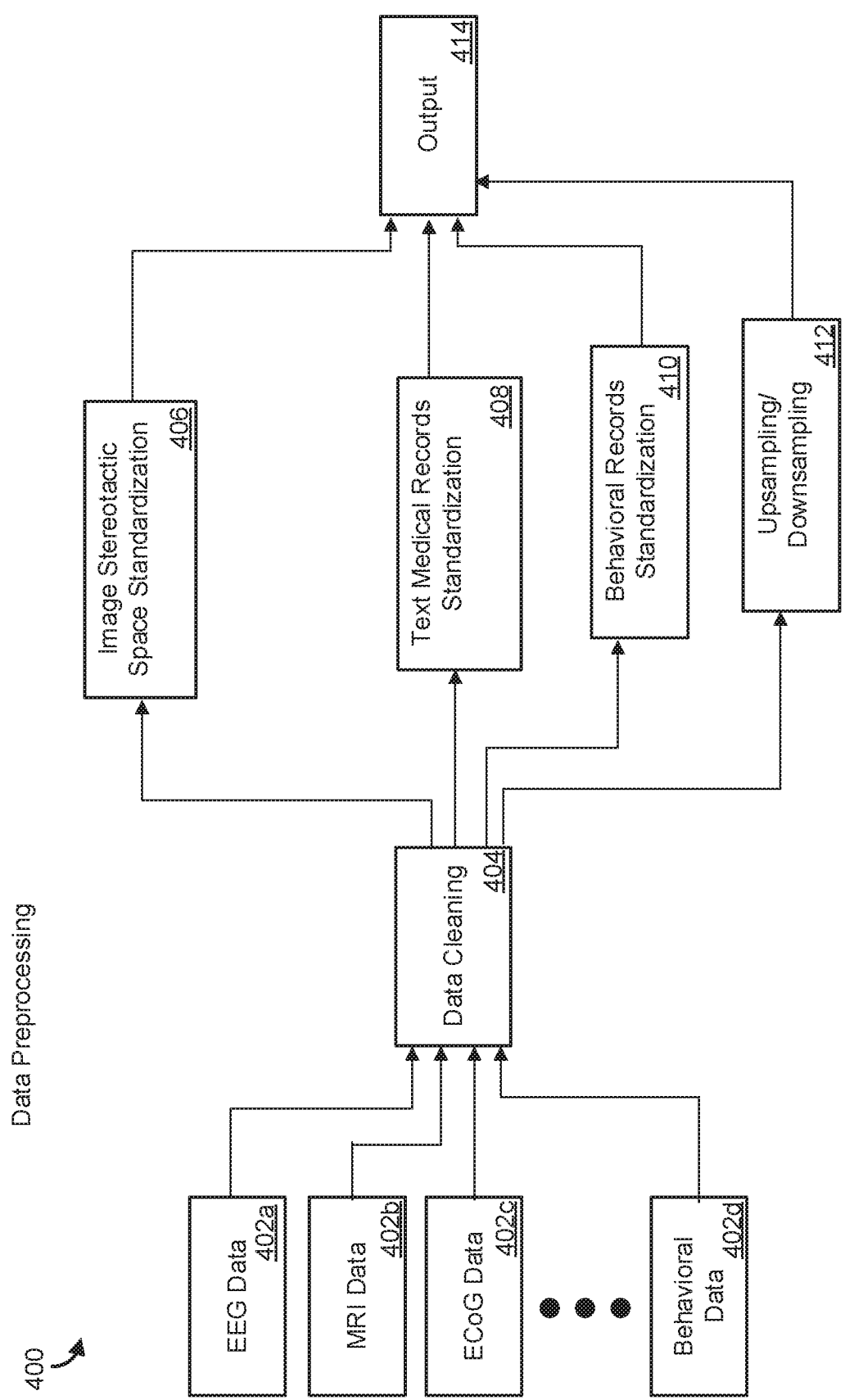
FIG. 4 is a block representation of the data-preprocessing module that is part of the backend server.

FIG. 4 is a block representation of the data-preprocessing module 400 that is part of the backend server 300. The preprocessing module 400 includes sub-modules such as data cleaning 404, data standardization 406, 408, and 410, and an upsampling/downsampling module 412 for some records obtained from a frequency-related data stream. Data standardization can include any functions that normalize the data for later statistical analysis. The data collected by the application 200, such as EEG data 402a, the MRI data 402b, the ECoG data 402c, the behavioral data 402d, and any other data collected are sent to a data-cleaning module 404. The data-cleaning module 404 removes noise from signals (if needed), performs filtering and sub sectioning, and so forth to prepare the data for standardization. Image data are standardized in an image stereotactic space 406. The text records are standardized in module 408. The behavioral records are standardized in module 410. The frequency-based data are upsampled or downsampled at module 412. These standardized data are sent to an output 414 for further preprocessing at module 500 of server 300.

The preprocessing procedure for medical images can be extensive, and depends on different variables such as the scope of the issue to be analyzed (stroke, different types of tumor, for instance). As an example, in general the preprocessing steps for functional MRI: slice time correction, motion correction, physiological correction and removal of physiological noises, co-registration, normalization, spatial filtering, temporal filtering, etc. These steps are part of the standardization process 406.

Figure 5:
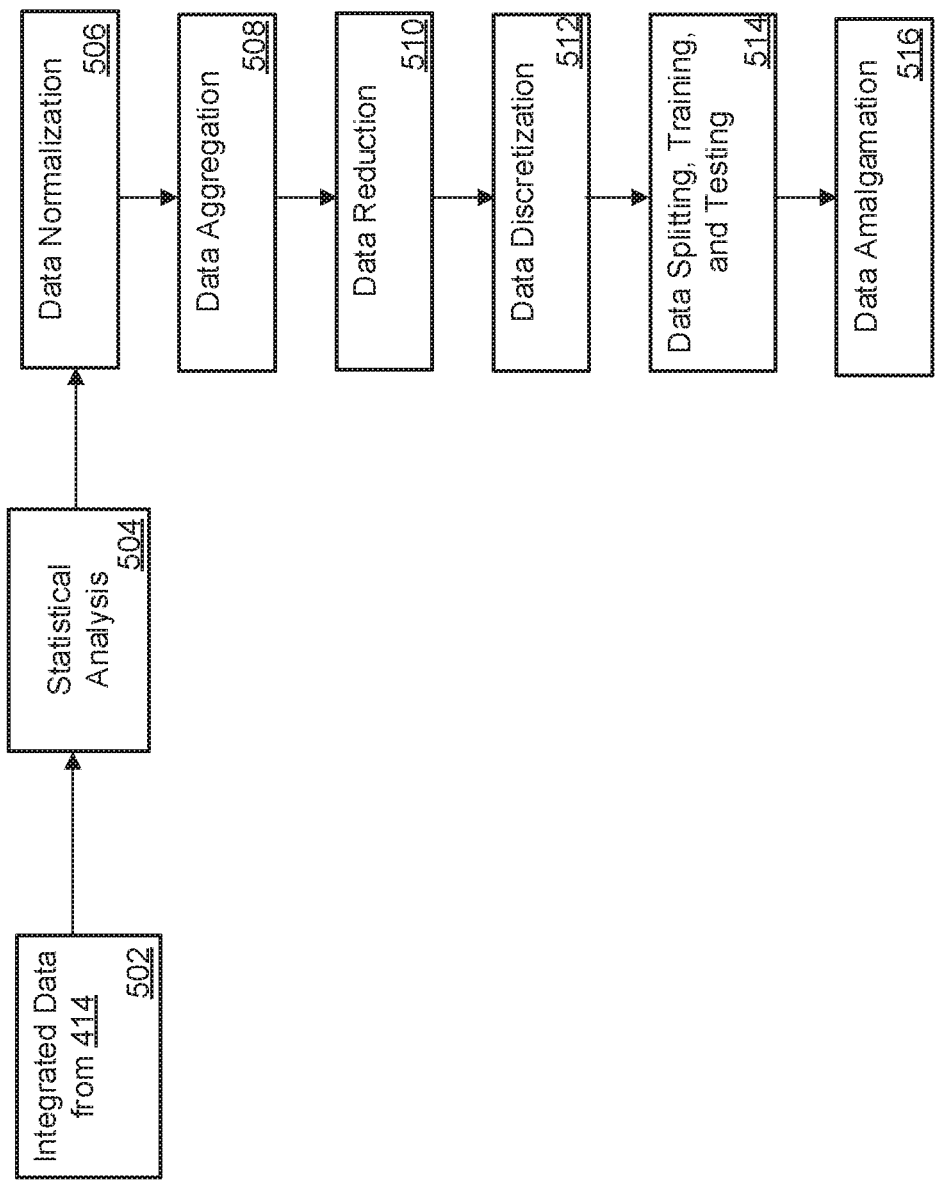
FIG. 5 is a block diagram that shows all the sequential steps followed by the different data-streams.

FIG. 5 is a block diagram that shows all the sequential steps followed by the different data-streams. Each data-stream has its own set of characteristics that are analyzed with the statistical analysis block to perform later modifications. In the end, the data is split into training and testing sets. The data from output 414 are received at module 502, and sent to module 504 for statistical analysis, such as profiling the data. The data are normalized at module 506, aggregated at module 508, reduced at module 510, discretized at module 512, and split for testing and training at module 514. The data amalgamation 516 is sent to develop and train the predictive models at module 600.

Figure 6:
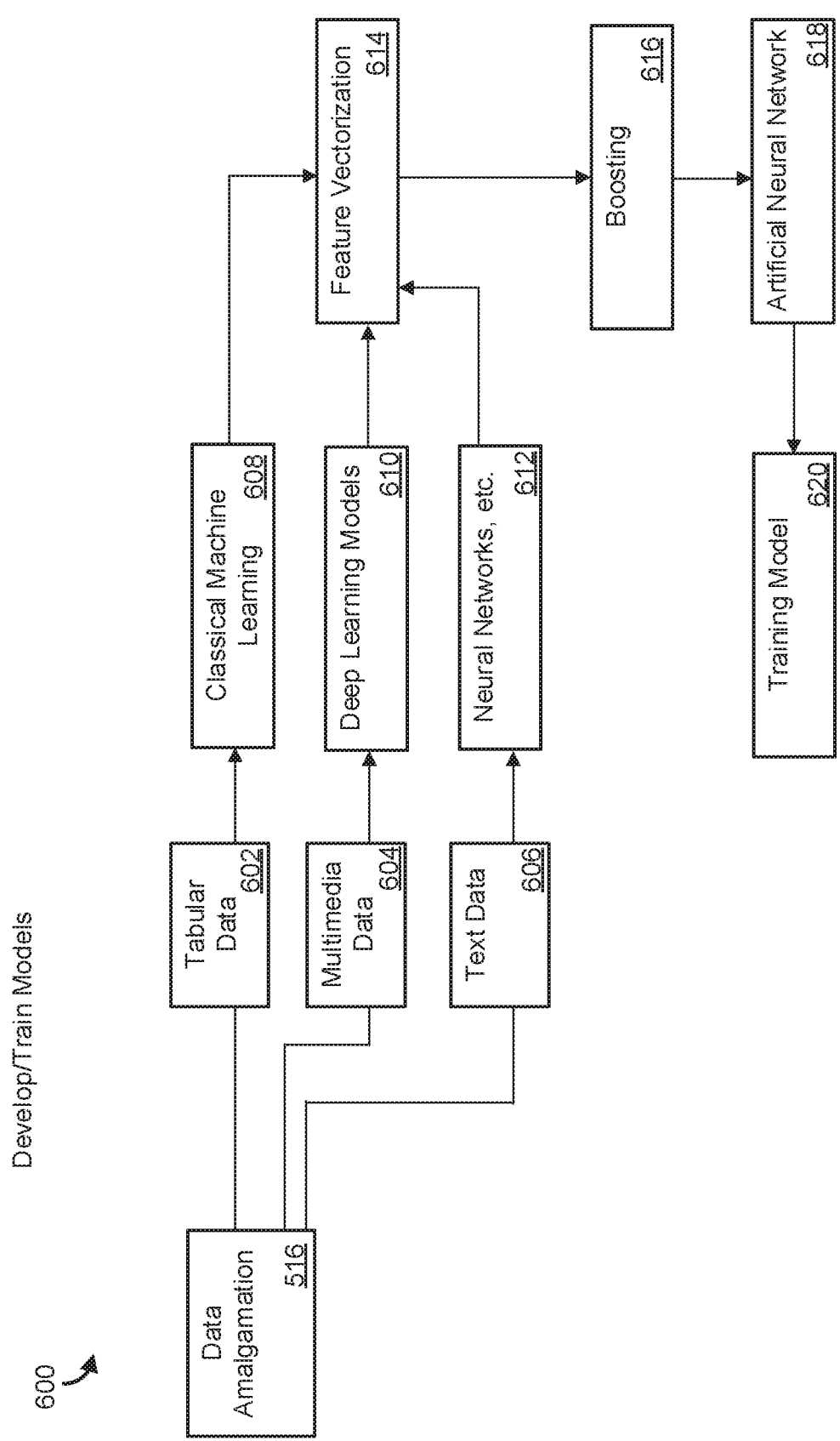
FIG. 6 is a block diagram that shows all the steps followed by the training models.

FIG. 6 is a block diagram that shows all the steps followed by the training models in a training module 600 of the data processing system 300. The data amalgamation 516 is sent to different modules depending on the data type. The training module 601 is a complex system that can include machine learning, deep learning, and statistical modelling. Therefore, the following is an example of the possible implementations that the data can traverse to generate a model to make the predictions described above. To illustrate, the tabular data 602 are sent to classical machine learning models 608, multimedia data 604, including video, audio, etc. are sent to deep learning models 610, such as recurrent neural networks or to a convolutional neural network. Text data 606 are sent to other machine learning models 612 such as convolutional neural networks. After differentiated training, the system will create a vector through the feature vectorization module 614. This module can potentially combine different outcomes to create a set of features per patient, per brain region. Next, the system will be capable of using different Ensemble methods to take advantage of the different data types obtained from previous stages. In one implementation, the vectorized feature form can be used in parallel with bagging, boosting, and stacking ensemble methods to boost the prediction accuracy, and sensitivity of the system. In another implementation, the outputs obtained from the modules 608, 610, 612 can be used in parallel with the ensemble methods (or some variations) enlisted above.

Figure 7:
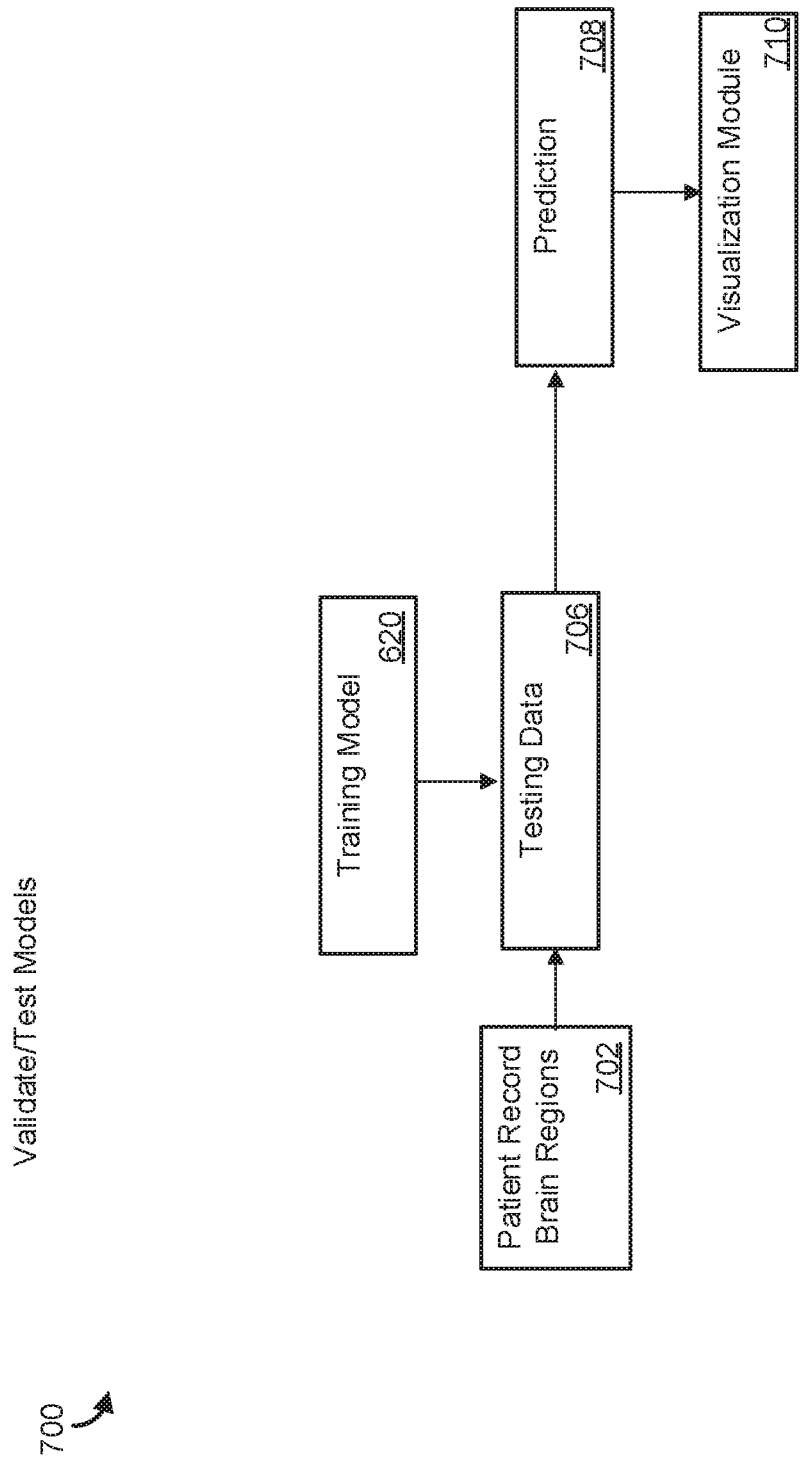
FIG. 7 is a block diagram that shows the final module of the backend-server.

FIG. 7 is a block diagram that shows the final module of the backend-server 300. In this case, it takes the testing data to validate the model created during the training phase. Then, it creates a set of predictions based on the regions of interest of the brain, and its corresponding visualization that will be sent back to the client standalone application 200 to be displayed. The records 702 are received and sent to the training module 620. Testing data 706 are generated. The testing data 706 form a prediction 708, which are used to generate the visualization data at the visualization module 710. FIG. 4 is a block diagram showing an example model 400 for generating the visual representation of FIGS. 1-3. The application 200 is configured to transform the data streams received from the sensors and patient feedback from tests as previously described into feature data on which (for instance) machine learning models can operate. The machine learning models can be trained with data from the data consortium. The models can include neural networks and deep learning networks, support vector machines, decision trees, statistical models (e.g., regression models), instance based or clustering models, and so forth.

The core predictions generated by the machine learning algorithms concern patient performance on reference neuropsychological tests described above (e.g., sentence production, picture naming, and speech comprehension). The features in the machine learning analysis can be voxels (the smallest unit of spatial resolution in MRI), and values at each voxel for the different data streams that are acquired for each patient, and hosted in the cloud. For example, a data stream could be transformed into feature data as illustrated for fMRI data. fMRI activity can be used as feature values, such as beta weights, contrast weighted t values, etc. for a given cognitive task (multiple dimensions within this data type could correspond to the different fMRI experiments patients perform). The feature vector can include feature values for functional connectivity, of the region in the brain represented by a given voxel to core language centers. The feature vector can include a feature value corresponding to structural (white matter) connectivity from a region of the brain represented by a given voxel to core language centers. The feature vector can include feature values corresponding to behavioral performance of the patient during surgery when the region of the brain represented by the respective voxel is stimulated with direct electrical stimulation mapping. And so on, for all of the data streams. Importantly, features can also be created by integrating data streams, or by computing a ratio of values within a data stream (e.g., laterality indices computed over functional MRI data).

There are global patient-specific variables that are common to all regions of the brain and thus all voxels, because they are at a global patient level, including 1) demographic information (sex, education, and handedness), 2) tumor type, and 3) pre-operative cognitive levels on a range of tasks (as described above). The goal of the modeling is to generate a prediction of future patient cognitive ability based on the feature vector(s) for that patient. The application 200 returns to the provider (e.g., surgeon) as feedback the spatial distribution throughout the brain of that prediction, for instance as feature weights associated with each voxel, represented as a map of the brain combined (e.g., overlaid, enhanced, updated, etc.) with prediction data. For example, projecting feature weights onto the brain creates a map about the contribution of each point in the brain to the prediction about future behavior.

Figure 8:
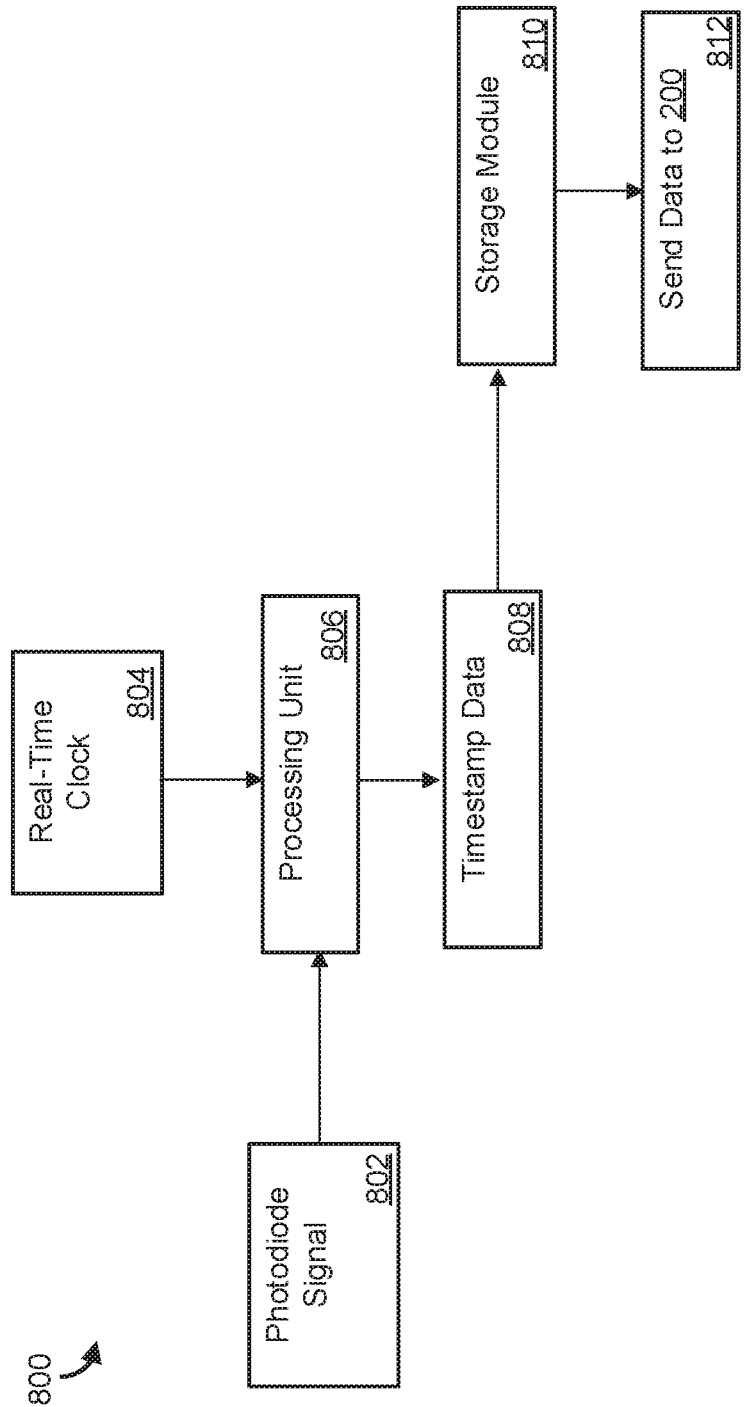
FIG. 8 is a block diagram of the external hardware box for controlling and time stamping the stimulus from a photodiode.

In an aspect, as described in relation to FIGS. 6-8, the data processing system 300 is configured to receive data from the client device 110 and the data storage 130, which can include tests results data. The data can be converted to a format that can be transformed into feature data, as described in relation to FIGS. 6-7. For example, speech data can be transformed into a string, and the features of the string can be related to semantic analysis (e.g., did the patient answer yes or no to questions, give the correct response, and so forth). An image of the brain represented by a set of voxels is provided. A particular region (e.g., a voxel or set of voxels) is selected. The selected region and the test results data are input into module 614. The module 614 generates a feature vector for the region representing the test results data for that region. The vector is inputted into training model 620. The model 620 generates prediction values 708 for various health outcomes. The prediction values are used to generate a visualization at module 710 of the brain showing predicted outcomes of treatment. In this example, the visualization shows regions that can be removed from the brain and regions that are not safe to remove (safe from the standpoint of cognitive performance on reference neuropsychological tasks, reference performance levels or general competencies). While a simplified two-dimensional (2D) image is shown for illustrative purposes, the visualization is generally projected onto a detailed, 3D rendering of the brain with millimeter resolution and showing patient-specific gyrual and subcortical anatomy.

FIG. 8 is a block diagram of the external hardware box 800 that uses a real-time clock to timestamp all the onset-offsets of the photodiode corresponding to visual stimuli presented to the patient on a screen or a display. The stimulus onset/offset detector box 800 receives the photodiode signal 802 and uses a real-time clock 804 to generate time-stamped data 808 using a processing unit 806. The timestamp data 808 are associated with the stimulation point and its corresponding patient behavioral data. The timestamp data 808 are stored locally in a module 810 until requested by the application 200 and sent by module 812; the duration of the local storage prior to being requested by application can be at the trial, experiment or session level.

Figure 9:
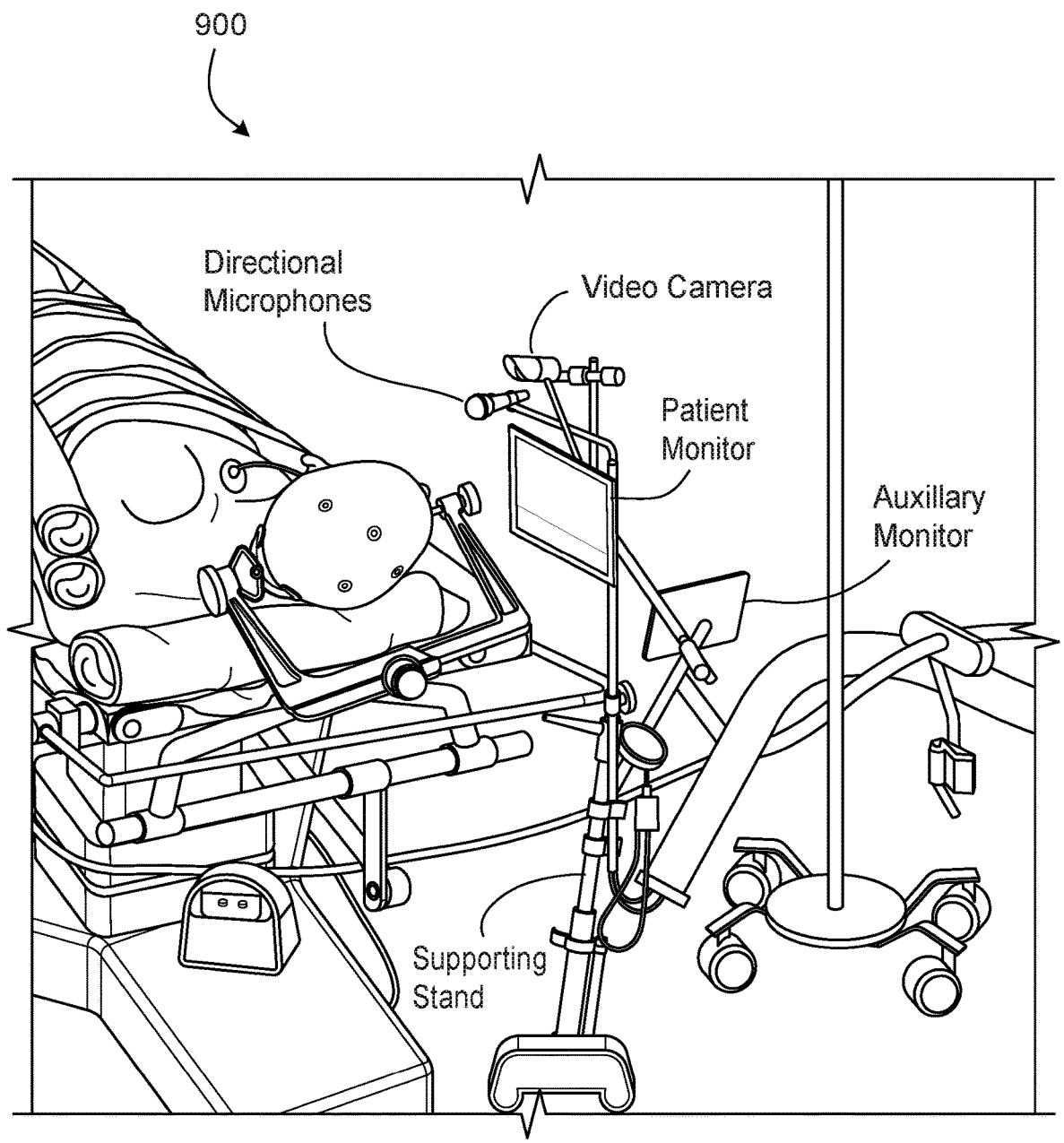
FIG. 9 is an example image of a hardware configuration of the computing environment of FIG. 1.

FIG. 9 is an example image of a hardware configuration 900 of the computing environment of FIG. 1 for an operating room. In some implementations, the system is mobile and has a small footprint in what can be a crowded operating room. In some implementations, the system is able to be repositioned in the changing environment of the operating room, as well as compatible across different operating rooms. For example, the interface with the patient (e.g., monitors, screens, microphones, video camera) are adaptable in real time to the changing ergonomics of the patient as the operation precedes, including changes in the positioning of the operating table throughout the surgery.

Figure 10:
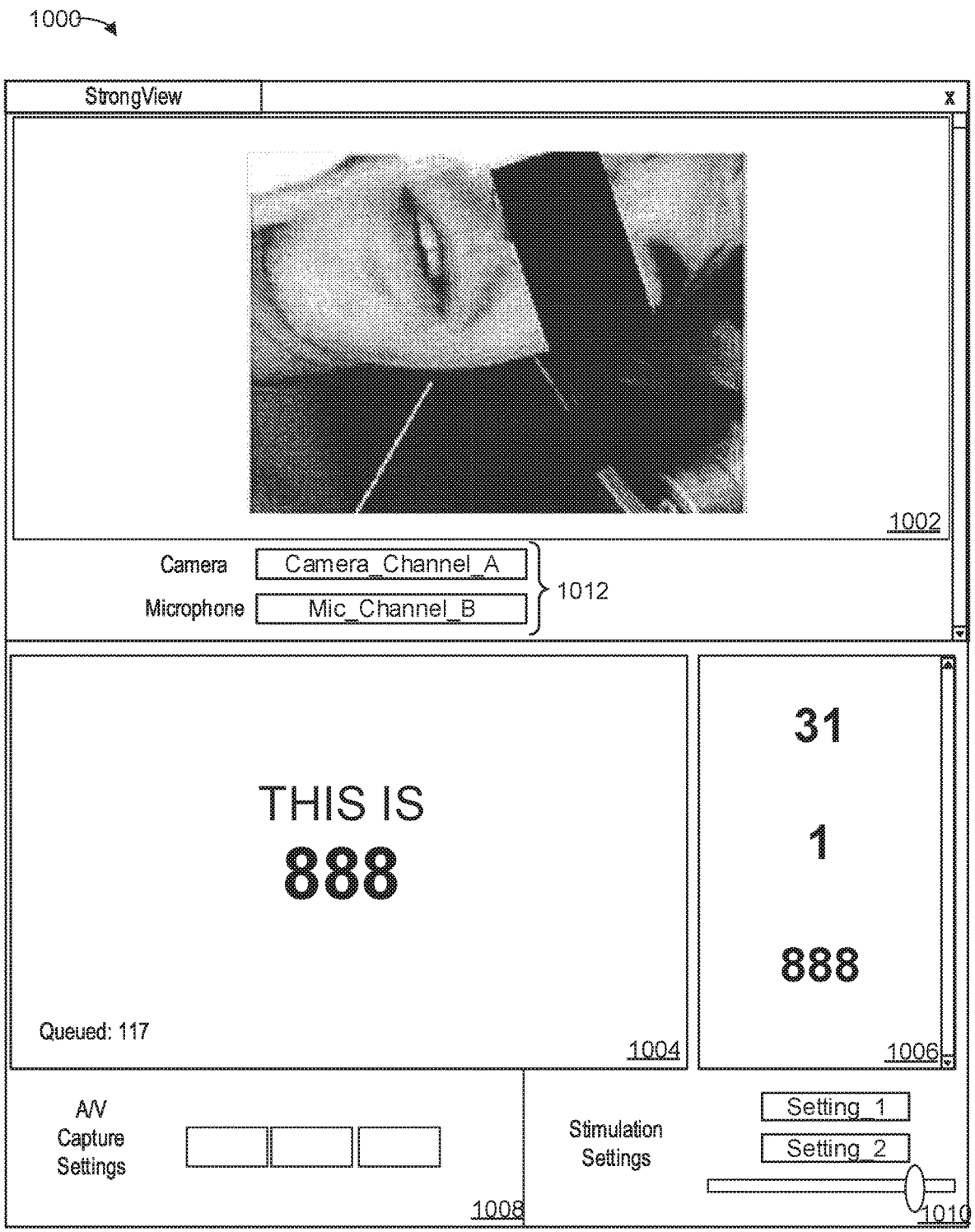
FIG. 10 is an example user interface for the mapping visualization system of FIGS. 1-2.

FIG. 10 is an example user interface 1000 for the mapping visualization system of FIGS. 1-2. The interface 1000 can be presented on the hardware interface 216 described previously. The interface 1000 includes an image 1002 of the patient during the treatment or stimulation. The interface 1000 includes audio/visual controls 1012. for the cameras and microphones of the system. The interface includes testing data 1004 and test protocol data 1006. Additional controls 1008 and 1010 can be used to adjust the test or stimulation, including a joystick or mouse-based control of an extendable arm on which a camera is mounted that has a view of the patient's brain and the surgeon (in the operating room), or the entire hospital room in the case of electrical stimulation mapping (in an inpatient setting), or the entire patient and provider sitting at a desk (in an outpatient setting). All aspects of the interface can be operated/monitored remotely from where the test is being performed.

Figure 11:
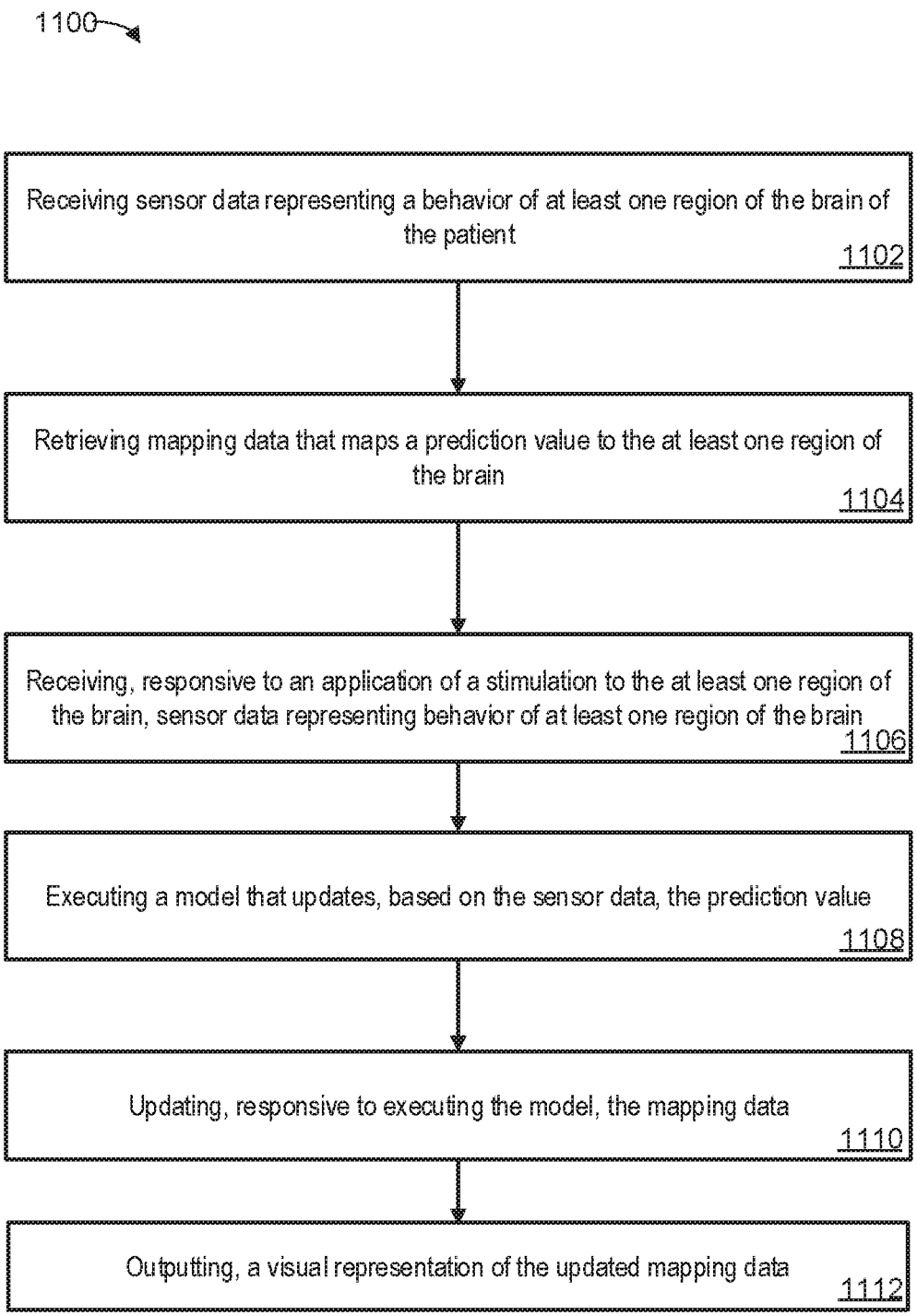
FIG. 11 shows a flow diagram including an example process for outputting a visual representation of a brain of a patient by the mapping visualization system of FIGS. 1-2.

FIG. 11 shows a flow diagram 1100 including an example process for outputting a visual representation of a brain of a patient by the mapping visualization system of FIGS. 1-2. The system is configured to receive (1102) sensor data representing a behavior of at least one region of the brain of the patient. The system is configured to retrieve (1104) mapping data that maps a prediction value to the at least one region of the brain, the prediction value being indicative of an effect on a behavior of the patient responsive to a treatment of the at least one region of the brain of the patient, the mapping data being indexed to a patient identifier. The system is configured to receive (1106), responsive to an application of a stimulation to the at least one region of the brain, sensor data representing behavior of at least one region of the brain. The system is configured to execute (1108) a model that updates, based on the sensor data, the prediction value for the at least one region of the brain. The system is configured to update (1110), responsive to executing the model, the mapping data by including the updated prediction value in the mapping data. The system is configured to output (1112) a visual representation of the updated mapping data comprising the updated prediction value.

A particular test protocol and treatment regimen can be configured as described here. At the pre-operative stage, the provider sees the patient in clinic and orders tests such as neuropsychological tests described above. Data can be ordered to improve the map of the patient's brain, such as an MRI, fMRI, DTI, DST, TMS, and CT imaging. The provider then schedules the patient for testing, reviews the protocol for selecting the neuropsychological tests, and suggests changes to the protocol if applicable. The provider then administers the chosen neuropsychological tests. The provider can score testing results, interpret the scored testing results, and repeat some tests if needed. Once all data are acquired from tests and imaging, the provider can simulate patient outcome for a given surgical approach. The provider need not be a single individual, and can include one or more medical service providers for the patient. For example, the provider can include physical therapist, nurse, surgeon, doctor, and so forth.

In an example, a pre-operative path for epilepsy is described. The provider develops a seizure onset hypothesis using previously acquired imaging data, semiology and neuropsychological data. The provider initiates a clinical conference #1 to discuss electrode implantation to identify the epileptogenic onset zone. The provider collects a high resolution anatomical MRI (which can also be used for cranial navigation, including for electrode placement in the first place). The provider may collect functional MRI and/or other functional imaging modalities (PET, MEG) at this point as well. The provider may use extra-cranial stimulation devices to test hypotheses of functional localization (e.g., TMS). The provider implants the electrodes. The provider orders CT imaging to identify electrode contact points. The software provider anonymizes and face strips the data. The provider merges CT and MRI imaging results. The provider merges DTI and CT/MRI results. The provider merges fMRI with CT/MRI/DTI imaging results.

The provider then creates a 3D mesh using the application 200. The provider titrates patient off anti-epileptic medication. When the patient has seizures and it is possible to positively identify the seizure onset zone, then the patient may be put back on anti-epileptics. The provider can perform electrical stimulation based mapping. The provider can initiate a clinical conference to determine a resection plan, and determine whether the surgery should be carried out awake or asleep. If the surgery is to be awake, then tests must be selected for use in the operating room; if the surgery will be asleep, then the full resection plan must be in place prior to going to the operating room.

For surgical operations, the provider identifies dicoms to be used for cranial neuronavigation planning (e.g., BrainLab). The provider merges DTI and MRI imaging. The provider merges fMRI with MRI/DTI imaging. The provider creates 3D mesh through the application 200. The provider initiates a clinical conference to determine a resection path and determines an awake vs. an asleep case.

At the intra-operative stage, the provider uploads a surgical plan to the cranial navigation system (e.g., BrainLab), This plan consists of anatomical MRI's of the patient with various data streams overlaid (e.g., DSI, points of TMS, functional MRI, etc.). The provider retrieves an MRI in BrainLab and uses a registration star to calibrate the location of the electrical stimulator in the surgical field, to be able to stream coordinates of stimulation. The provider sets up the cart in the operating room, including the patient monitor, EEG, BrainLab, cameras, audio check, registers the hi-polar stimulator, registers intra-operative electrodes; during and after the case, the provider confirms all data are present before leaving the operating room. The provider sends the data to the consortium. The patient stays as an inpatient and receives bedside neuropsychological testing. The provider schedules a post-operative visit before the patient leaves the hospital.

At the post-operative stage, the provider sees the patient in the neurosurgery clinic, and ensures that the patient repeats neuropsychological tests at multiple time points post-operatively. The provider initiates a conference to discuss how the case went. In some implementations, a standing clinical appointment every 6-12 months is scheduled. Neuropsychological and imaging data collected during these post-operative visits is sent back to the data consortium and the patient's cognitive dashboard.

A specific example of an implementation of using the system including the application 200 is now described. The provider runs all intraoperative cognitive testing on the system including the application 200. The provider sets up an audio system such that a directional microphone that is trained on the patient's mouth feeds through a splitter. Generally, one channel coming out of the splitter goes through an amplifier and directly to a speaker. This allows surgeons and researchers to hear the patient's responses against the background noise of the operating room with zero perceptible delay (i.e., eliminating 'echo' effects). Generally, the second channel from the splitter goes to the PC on the mobile cart, where it is time-stamped, recorded and stored (these files are used for offline analysis). The system also has a separate (stand-alone) audio system that consists of a second directional microphone also trained on the patient, a directional microphone trained on the surgeons, and a 'noise' microphone in a corner of the operating room to sample room tone for subtraction from the main audio files. Those three audio channels feed to a MIDI, and to a second computer that records each channel separately. This second audio system provides redundancy should the primary system fail; all verbal responses of the patient will be available for offline analysis.

The provider attaches a commercially available ether screen L-bracket to the operating room (OR) table using an OR table clamp. The provider attaches articulating arms (e.g., Manfrotto 244 Variable Friction Magic Arms) to the ether screen L-bracket, and those articulating arms support the patient monitor, directional microphones, video camera trained on the patient's face, and an auxiliary monitor to allow a research team member or operating room nurse to see what the patient sees while interacting with the patient.

The provider runs all necessary cables for the screens, microphones, and camera along the arm. Generally, none of this equipment needs to be sterilized as it is (only ever) on the non-sterile side of the field. This manner of supporting stimulus presentation and response recording equipment provides maximal flexibility to take into account the differing ergonomics of cognitive testing according to patient positioning which varies case by case, yet provides a reliable and stable platform on which to attach equipment. Because all monitors, microphones and cameras are attached to the OR table via single device (either screen L-bracket), adjustments to the positioning of the table during the case do not affect the testing setup. For patient safety, the entire setup for cognitive testing can be broken down quickly during the case should an emergent situation present that mandates full and unobstructed access to the patient (e.g., to the patient's airway).

The provider configures the system for i) presenting stimuli (visual, auditory) to patients and recording patient responses (verbal, button response, video), ii) temporally registering all experimentally-relevant events and measures (stimulus on, ECoG, contact with brain of direct electrical stimulator probe, patient responses); and iii) communication with cranial navigation systems to obtain the 3 dimensional coordinate for each application of direct electrical stimulation. The system allows on-line re-calibration of experimental variables such as stimulus duration, inter-stimulus-intervals, randomization, number of repetitions or blocks of stimuli, and control of the patient video and audio channels. The system streams the patient video camera, the online ECoG data, and the stimulus that the patient is currently seeing/hearing to a desktop display, which is also mirrored on a large monitor that is in the line of sight of the surgeon.

The provider attaches a photodiode to the patient monitor and feeds into an open channel on the ECoG amplifier. This provides a temporal sync between presentation of each stimulus and ECoG for offline analysis.

The provider uses cranial navigation hardware and software (e.g., BrainLab Inc., Munich, Germany) for intraoperative cranial navigation based on pre-operative MRI. This is an optical system consisting of a set of cameras that view the operating field and register the patient's head via a fixed registration star that is affixed to the operating table. Specifically, after the patient is set in the head-holder, but before draping, the provider uses the facial physiognomy of the patient to register the patient's head to the preoperative MRI. This allows pre-operative MRI (functional and structural) to be brought into direct alignment with the patient's brain on the operating table.

The provider attaches a second (much smaller) registration star to the bipolar stimulator and uses it to register the stimulator's length and position in the field. This enables the research team to acquire the precise location of each point of stimulation as well as the margins of the resection, relative to pre-operative MRI. As noted above, the system can be connected with the cranial navigation system (e.g., BrainLab, connection via IGT link) to allow for real time streaming (and time stamping) of the coordinates of direct electrical stimulation mapping.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the client device, the application 200, and their modules and sub-devices, can be implemented using digital electronic circuitry, or in computer software, firmware, or hardware, or in combinations of one or more of them. In another example, the process 1100 can be implemented using digital electronic circuitry, or in computer software, firmware, or hardware, or in combinations of one or more of them.

Some implementations described in this specification (e.g., modules of 200) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, one or more of the modules described above can each comprise a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 12:
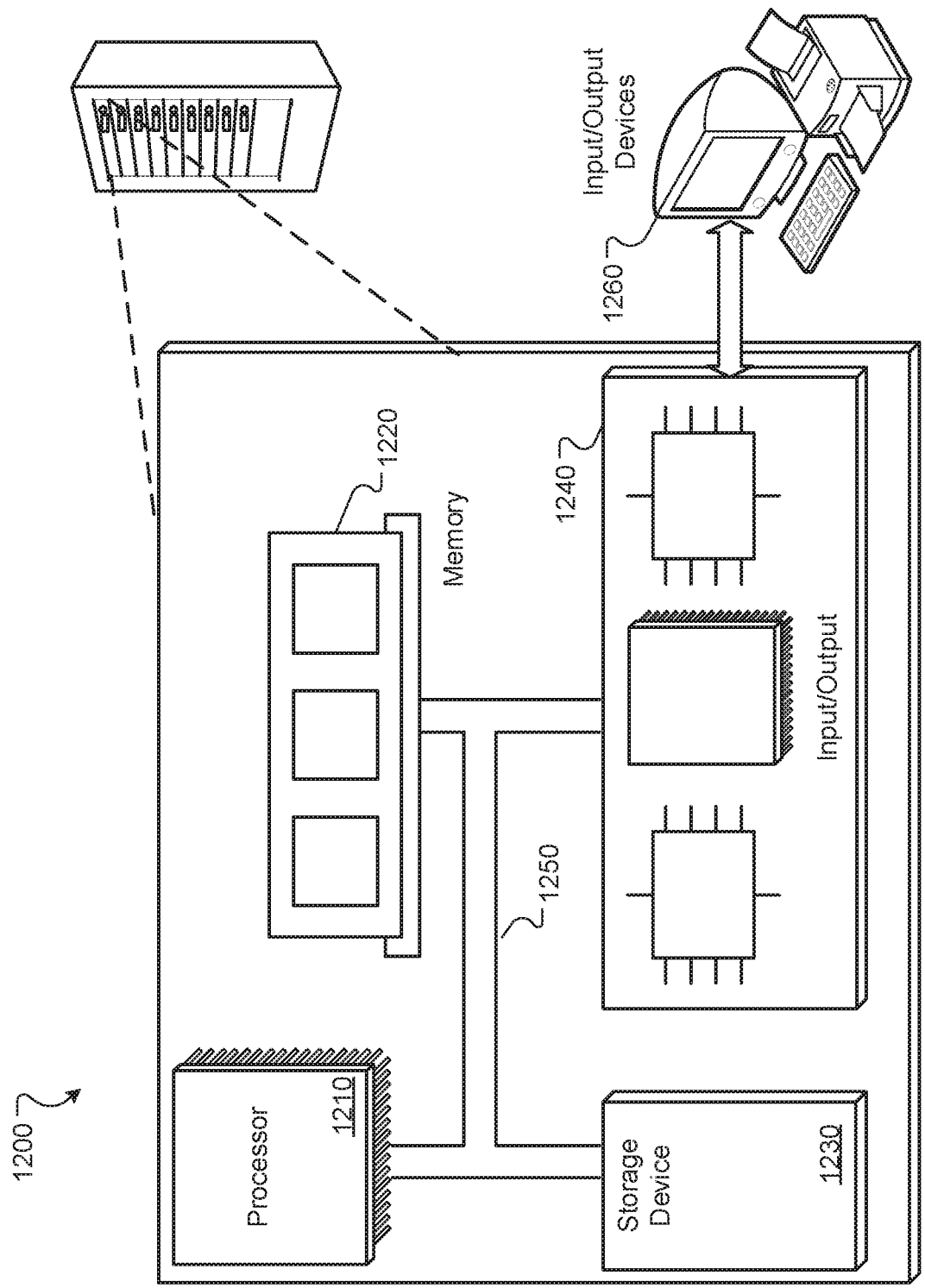
FIG. 12 is a diagram of an example computing system.

FIG. 12 shows an example computer system 1200 that includes a processor 1210, a memory 1220, a storage device 1230 and an input/output device 1240. Each of the components 1210, 1220, 1230 and 1240 can be interconnected, for example, by a system bus 1250. The processor 1210 is capable of processing instructions for execution within the system 1200. In some implementations, the processor 1210 is a single-threaded processor, a multi-threaded processor, or another type of processor. The processor 1210 is capable of processing instructions stored in the memory 1220 or on the storage device 1230. The memory 1220 and the storage device 1230 can store information within the system 1200.

The input/output device 1240 provides input/output operations for the system 1200. In some implementations, the input/output device 1240 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1260. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A system for outputting a visual representation of a brain of a patient, the system comprising:
    at least one sensor configured to generate sensor data measuring a behavior or phenomenology of the patient associated with at least one region of the brain of the patient, the measuring being when the patient is performing at least one of a cognitive task, a sensory task, or a motor task associated with the at least one region of the brain of the patient;
    a data storage storing mapping data that maps a prediction value to the at least one region of the brain, the prediction value being indicative of an effect on a behavior of the patient responsive to a treatment of the at least one region of the brain of the patient, the mapping data being indexed to a patient identifier; and
    at least one processing device configured to receive the sensor data from the at least one sensor, the at least one processing device configured to perform operations comprising:
        retrieving the mapping data indexed to the patient identifier;
        receiving, responsive to stimulation to the at least one region of the brain, sensor data measuring an additional behavior or phenomenology of the patient related to the at least one of the cognitive task, the sensory task, or the motor task associated with the at least one region of the brain of the patient;
        measuring an additional behavior or phenomenology of the patient, related to at least one of a cognitive task, a sensory task, or a motor task, for the at least one region of the brain of the patient;
        executing a model that updates, based on the sensor data, the prediction value for the at least one region of the brain;
        updating, responsive to executing the model, the mapping data by including the updated prediction value in the mapping data; and
        outputting, a visual representation of the updated mapping data comprising the updated prediction value, wherein the at least one region of the brain corresponds to a voxel of a magnetic resonance imaging (MRI) image.

2. The system of claim 1, wherein the mapping data comprise, for each region of the brain including the at least one region, a feature vector representing at least one feature having a value, the updated prediction value being a function of the value of the at least one feature.

3. The system of claim 2, wherein the feature vector represents a plurality of features each having a value, and wherein the updated prediction value is a function of each value of the plurality of features.

4. The system of claim 2, wherein the updated prediction value is a function of one or more first values of respective features represented by a first feature vector of a first region comprising the region and one or more second values of respective features represented by a second feature vector of a second region neighboring the first region.

5. The system of claim 2, wherein the at least one feature represents functional magnetic resonance imaging (fMRI) activity of the brain.

6. The system of claim 2, wherein the at least one feature represents a functional connectivity of the region of the brain to a core language center of the brain.

7. The system of claim 2, wherein the at least one feature represents structural connectivity of the region of the brain to a core language center of the brain.

8. The system of claim 2, wherein the at least one feature is common to all regions of the brain of the patient, and wherein the at least one feature represents one of a patient demographic, a tumor type, a pre-operative level of the at least one of the cognitive task, the sensory task, or the motor task, or a combination thereof.

9. The system of claim 1, wherein the sensor data comprises one or more of audio data, electroencephalogram (EEG) data, video data, or a combination thereof.

10. The system of claim 9, wherein the video data comprises at least two video streams recorded simultaneously.

11. The system of claim 1, wherein the model is configured to allow the at least one processing device to execute the model and to update the mapping data in real-time during a surgical operation based on the sensor data received during the surgical operation.

12. The system of claim 1, wherein the visual representation comprises a three dimensional image of the brain of the patient comprising an indication of at least one target region of the brain for removal.

13. The system of claim 1, further comprising retrieving pre-operative data associated with the patient identifier, the pre-operative data representing a state of the brain of the patient for the at least one region prior to a treatment, wherein executing the model is based on the pre-operative data.

14. The system of claim 13, wherein the pre-operative data comprises a vasculature model of the brain, and wherein executing the model comprises updating the prediction value responsive to receiving sensor data for updating the vasculature model of the brain.

15. The system of claim 1, wherein the effect on the behavior of the patient responsive to the treatment of the at least one region of the brain comprises an estimation of an activity deficit after the treatment for that region of the brain.

16. The system of claim 1, wherein the visual representation is configured for transmission to a remote medical service provider during a surgical operation.

17. The system of claim 1, the operations further comprising:
    generating, based on the mapping data, a prediction of a future behavior or of the phenomenology associated with the at least one region of the brain of the patient or another patient.

18. A system for outputting a visual representation of a brain of a patient, the system comprising:
    at least one sensor configured to generate sensor data measuring a behavior or phenomenology of the patient associated with at least one region of the brain of the patient, the measuring being when the patient is performing at least one of a cognitive task, a sensory task, or a motor task associated with the at least one region of the brain of the patient;

a data storage storing mapping data that maps a prediction value to the at least one region of the brain, the prediction value being indicative of an effect on a behavior of the patient responsive to a treatment of the at least one region of the brain of the patient, the mapping data being indexed to a patient identifier; and at least one processing device configured to receive the sensor data from the at least one sensor, the at least one processing device configured to perform operations comprising:

retrieving the mapping data indexed to the patient identifier;

receiving, responsive to stimulation to the at least one region of the brain, sensor data measuring an additional behavior or phenomenology of the patient related to the at least one of the cognitive task, the sensory task, or the motor task associated with the at least one region of the brain of the patient;

measuring an additional behavior or phenomenology of the patient, related to at least one of a cognitive task, a sensory task, or a motor task, for the at least one region of the brain of the patient;

executing a model that updates, based on the sensor data, the prediction value for the at least one region of the brain;

updating, responsive to executing the model, the mapping data by including the updated prediction value in the mapping data; and outputting, a visual representation of the updated mapping data comprising the updated prediction value, wherein the mapping data comprise, for each region of the brain including the at least one region, a feature vector representing at least one feature having a value, the updated prediction value being a function of the value of the at least one feature; and wherein the at least one feature represents a behavioral performance of the patient when the region of the brain is stimulated with direct electrical stimulation mapping.

19. The system of claim 18, wherein the sensor data comprises speech data from the patient, speech data from a medical service provider, or a combination thereof.

20. The system of claim 18, wherein the stimulation to the region of the brain comprises administration of a drug to the patient, application of an electrical signal to the patient, or a combination thereof.

21. A system for outputting a visual representation of a brain of a patient, the system comprising:

at least one sensor configured to generate sensor data measuring a behavior or phenomenology of the patient associated with at least one region of the brain of the patient, the measuring being when the patient is performing at least one of a cognitive task, a sensory task, or a motor task associated with the at least one region of the brain of the patient;

a data storage storing mapping data that maps a prediction value to the at least one region of the brain, the prediction value being indicative of an effect on a behavior of the patient responsive to a treatment of the at least one region of the brain of the patient, the mapping data being indexed to a patient identifier; and at least one processing device configured to receive the sensor data from the at least one sensor, the at least one processing device configured to perform operations comprising:

retrieving the mapping data indexed to the patient identifier;

receiving, responsive to stimulation to the at least one region of the brain, sensor data measuring an additional behavior or phenomenology of the patient related to the at least one of the cognitive task, the sensory task, or the motor task associated with the at least one region of the brain of the patient;

measuring an additional behavior or phenomenology of the patient, related to at least one of a cognitive task, a sensory task, or a motor task, for the at least one region of the brain of the patient;

executing a model that updates, based on the sensor data, the prediction value for the at least one region of the brain;

updating, responsive to executing the model, the mapping data by including the updated prediction value in the mapping data; and outputting, a visual representation of the updated mapping data comprising the updated prediction value, wherein the treatment comprises surgical removal of the at least one region of the brain.

22. The system of claim 21, further comprising retrieving pre-operative data associated with the patient identifier, the pre-operative data representing a state of the brain of the patient for the at least one region prior to a treatment, wherein executing the model is based on the pre-operative data.

23. The system of claim 22, wherein the pre-operative data comprises a vasculature model of the brain, and wherein executing the model comprises updating the prediction value responsive to receiving sensor data for updating the vasculature model of the brain.

24. The system of claim 21, wherein the visual representation is configured for transmission to a remote medical service provider during a surgical operation.

* * * * *